United States Patent
Englander et al.

(10) Patent No.: US 12,403,825 B2
(45) Date of Patent: *Sep. 2, 2025

(54) ADVANCED PEDESTRIAN AND/OR DRIVER ALERT AND/OR COLLISION AVOIDANCE SYSTEM

(71) Applicant: ROSCO, INC., Jamaica, NY (US)

(72) Inventors: Benjamin Englander, Woodmere, NY (US); Clayton Dean, Brooklyn, NY (US); John Polimeni, Long Island City, NY (US); Michael Cacic, East Northport, NY (US); Mathew Locoteta, Middle Island, NY (US); Julian Serer, Plainview, NY (US)

(73) Assignee: Rosco, INC., Jamaica, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/408,918

(22) Filed: Jan. 10, 2024

(65) Prior Publication Data

US 2024/0157873 A1 May 16, 2024

Related U.S. Application Data

(63) Continuation of application No. 17/196,883, filed on Mar. 9, 2021, now Pat. No. 11,890,987.

(Continued)

(51) Int. Cl.
*B60Q 5/00* (2006.01)
*B60Q 1/50* (2006.01)

(Continued)

(52) U.S. Cl.
CPC .............. *B60Q 5/006* (2013.01); *B60Q 1/525* (2013.01); *B60R 16/023* (2013.01); *B60W 40/10* (2013.01); *B60W 50/14* (2013.01); *G08G 1/005* (2013.01); *G08G 1/166* (2013.01); *B60W 2420/403* (2013.01); *B60W 2420/408* (2024.01); *B60W 2554/4029* (2020.02); *B60W 2554/4042* (2020.02); *B60W 2554/80* (2020.02); *B60W 2555/20* (2020.02)

(58) Field of Classification Search
None
See application file for complete search history.

(56) References Cited

U.S. PATENT DOCUMENTS 9,718,405 B1 * 8/2017 Englander ............... B60R 1/008
2016/0005313 A1 * 1/2016 Cholayil .................. G08G 1/04
340/907

(Continued)

FOREIGN PATENT DOCUMENTS

| CA | 3094275 A1 | 9/2011 |
|---|---|---|
| CN | 205113134 | 3/2016 |

(Continued)

*Primary Examiner* — Fekadeselassie Girma
(74) *Attorney, Agent, or Firm* — Manatt, Phelps & Phillip

(57) ABSTRACT

An advanced pedestrian warning or alert system is a system for automotive vehicles is described herein in various embodiments. This system detects if a vulnerable road user, for example a pedestrian, is at an unsafe distance from the moving vehicle. If a pedestrian is too close to the vehicle when the vehicle is in motion, then the system will issue auditory and/or visual warnings to notify the pedestrian back to safety.

28 Claims, 21 Drawing Sheets

Related U.S. Application Data

(60) Provisional application No. 62/988,314, filed on Mar. 11, 2020.

(51) Int. Cl.
    *B60R 16/023*    (2006.01)
    *B60W 40/10*     (2012.01)
    *B60W 50/14*     (2020.01)
    *G08G 1/005*     (2006.01)
    *G08G 1/16*      (2006.01)

(56) References Cited

U.S. PATENT DOCUMENTS

| | | | |
|---|---|---|---|
| 2020/0108826 A1* | 4/2020 | Kim | B60W 30/18159 |
| 2020/0211370 A1* | 7/2020 | Chen | G08G 1/0129 |
| 2021/0237581 A1* | 8/2021 | Rajaie | B60T 7/18 |
| 2021/0287546 A1* | 9/2021 | Englander | G08G 1/166 |

FOREIGN PATENT DOCUMENTS

| | | |
|---|---|---|
| CN | 208360045 | 1/2019 |
| JP | 4696339 B2 | 6/2011 |

\* cited by examiner

FIG. 22

ADVANCED PEDESTRIAN AND/OR DRIVER ALERT AND/OR COLLISION AVOIDANCE SYSTEM

RELATED APPLICATIONS

This application is a continuation of U.S. application Ser. No. 17/196,883 filed on Mar. 9, 2021, which claims the benefit of, and priority to, U.S. Provisional Application No. 62/988,314, filed on Mar. 11, 2020. This application is related to U.S. application Ser. No. 15/911,853 filed on Mar. 5, 2018, now U.S. Pat. No. 10,549,690, which is a continuation of U.S. application Ser. No. 15/448,432 filed on Mar. 2, 2017, now U.S. Pat. No. 9,908,470, which is a continuation of U.S. application Ser. No. 15/078,183, filed on Mar. 23, 2016, now U.S. Pat. No. 9,718,405, which claims the benefit of, and priority to, U.S. Provisional Application No. 62/136,750, filed on Mar. 23, 2015. This application is also related to U.S. application Ser. No. 14/148,954 filed on Jan. 7, 2014, now U.S. Pat. No. 9,286,521. All of the above applications are hereby incorporated herein by reference in their entirety.

BACKGROUND

Operating a vehicle, in particular a larger commercial vehicle, entails particular difficulties and risks to the safety of nearby vulnerable road users (VRUs) such as pedestrians, bikers, motorcyclists, etc.

Conventionally, mirrors are attached to various parts of the exterior of the vehicle to enhance the driver's view. Mirrors, however, present their own challenges. First, a mirror and the arm or arms on which it is mounted protrude away from the vehicle. Mirrors can therefore be impact targets when the vehicle is in motion or is stationary. Additionally, mirrors do not provide a unified view from inside the cabin for the driver. For example, if a conventional cross-view mirror is attached to the front right side of the vehicle and a second cross-view mirror is attached on the front left side of the vehicle, then in order to ensure that the vehicle has clearance on both sides and that no pedestrians are in harm's way, the driver must look in opposite directions, to the right and then to the left, and then straight ahead before proceeding, perhaps even repeating this process one or more times. Blind spots may still occur on one or both sides of the vehicle, especially when the side mirrors are not adjusted properly, and/or in the front of the vehicle.

Pedestrian collision warning systems (or pedestrian collision avoidance systems) have been introduced to eliminate potential blind spots or provide additional warning to the vehicle driver by providing additional display or displays installed inside the cabin of the vehicle to display side views of the vehicle in addition to mirrors. One example of such systems is a blind spot monitor, which can be a vehicle-based sensor device that detects other vehicles located to the driver's side and rear. Warnings can be provided to the driver by flashing on the side mirrors or displays mounted in the vehicle. However, such systems do not provide warning to nearby vulnerable road users and existing driver warnings may be inadequate.

We have determined that improved systems for providing auditory and/or visual alerts to vulnerable road users that are in potentially harmful proximity to a moving vehicle, which address one or more of the foregoing issues and/or other related issues, are needed.

We have also determined that improved systems for intelligently determining whether and/or when to issue an auditory and/or visual warning to pedestrians and/or drivers is needed.

For example, we have determined that there is a need to warn pedestrians and/or drivers about a potential collision in an intelligent manner, and there is also a need to not issue unnecessary warnings that might interfere with the proper operation of a vehicle or generate excessive noise within the vehicle or outside the vehicle.

We have determined that geo fencing techniques can be used to trigger an alert to the driver or even the nearby vulnerable road users when the vehicle entering or exiting a geo-fence. However, we have determined using geo fence technique by making noise outside of the vehicle may annoy pedestrians even if no one is in jeopardy. In addition, we have determined that when the vehicle is in a residential neighborhood, using the geo fencing technique may cause sound pollution to the neighbors. Further, we have determined that when a vehicle is inside a depot and loses GPS connection, if the vehicle is equipped with geo fence technique, it may send out alerts and annoy workers nearby.

SUMMARY

The present invention provides, in some embodiments, an advanced pedestrian alert system for providing auditory and/or visual alerts to vulnerable road users (e.g., pedestrians, bikers, motorcyclists, etc.) that are in potentially harmful proximity to a moving vehicle (e.g., a bus, truck, etc.). This system detects if a vulnerable road user, object or pedestrian is at an unsafe distance from the moving vehicle. For example, if a pedestrian is too close to the vehicle when the vehicle is in motion, then the system will issue auditory and/or visual warnings to notify or warn the pedestrian of a potential and/or immediate collision event. In some embodiments, this system can comprise two subsystems, processes and/or functionalities: a pedestrian detection subsystem/process/functionality and a pedestrian alarm subsystem/process/functionality. The pedestrian detection subsystem can use image processing techniques or other detections techniques to detect pedestrians and issues appropriate or predetermined warnings/announcements based on the pedestrians position relative to the moving vehicle. The pedestrian alarm subsystem can issue auditory and/or visual warnings via, for example, speakers and/or strobe lights or other visual indicator. Advantageously, in some embodiments, there are a number of different pedestrian alerts based on the warning type that is received.

Pedestrian hazards in particular arise when a bus travels through an intersection with pedestrians located at various places in the intersection, including the intersection crosswalks. In some embodiments, the camera/sensor's field of view may be configured or adjusted to be narrower when the vehicle is traveling in the forward direction, and wider when the vehicle is turning, optionally responsive to sensors that detect the vehicle's direction.

A pedestrian risk on the right side of the bus arises when an unaware pedestrian, typically distracted by modern technology such as a phone, tablet or music device, enters a crosswalk alongside a bus in the midst of or beginning a right turn. The pedestrian, perhaps looking down at his device, keeps walking as the body of the bus "tracks" sideways during the turn and moves closer to the curb towards the pedestrian. The pedestrian may walk into the side of the bus, get knocked down and end up with his or her body or legs under the bus, risking getting rolled over by the rear wheels.

A pedestrian risk on the left side of the bus presents similar tracking challenges as on the right side, but with the addition of a driver's forward blind spot that may hide a pedestrian who disembarks from the curb and walks in a direction opposite the travel of the bus. Specifically, the pedestrian continues in the crosswalk and as the bus penetrates the intersection and starts the left turn, the pedestrian remains in a blind spot as he moves and the bus turns. The corner area defined by the pillar and neighboring parts of the bus come into contact with the pedestrian. The pedestrian may not actually be in the blind zone, but may nonetheless be hit because the driver may be looking to his left after deciding to make the turn.

The presence of a pedestrian can be missed or ignored due to distractions. These distractions also include passenger interactions with the driver. The systems described herein can reduce the risk of accidents by increasing the driver's situational awareness, including by alerting the driver of nearby pedestrians and potential collision courses, and/or by increasing the pedestrian's situational awareness, including by alerting the pedestrian of the nearby vehicle.

Systems of the present invention provide various combinations of interior and exterior cameras/sensor systems with interior and exterior audible alerts and/or warning/strobe lights associated therewith, strategically positioned around the interior and/or exterior of the vehicle and configured to detect hazards such as pedestrians that may be in the vehicle's path, and to alert the driver of the vehicle as well as the endangered pedestrians of a possible and/or imminent collision. Hazards may include, but are not limited to, a pedestrian, a possible collision with the pedestrian, an anticipated collision with the pedestrian, an object, object detection, vehicle detection, cyclist detection, pedestrian detection, potential collision avoidance, and potential collision detection.

In some embodiments, a multi-layer pedestrian and/or driver alert and/or collision avoidance system includes one or more sensing devices configured to sense vehicle speed, initiating a turn, yaw rate and/or turn rate, and/or pedestrian distance to the vehicle. A pedestrian and/or driver alarm system is configured to issue different visual alerts and/or warning messages, for example, when: (1) the speed of the vehicle is within a first predetermined speed range or over a first predetermined speed, (2) the vehicle initiates the turn or the yaw rate and/or turn rate of the vehicle is within the first predetermined rate range or over the first predetermined rate, and/or (3) the pedestrian is within the first predetermined distance to the vehicle. In some embodiments, the pedestrian alert and/or collision avoidance system includes a driver warning system generating a driver visual warning and/or a driver audible alarm configured to alert the driver when an exterior hazard is detected. In some embodiments, the pedestrian alarm system is configured to issue a second auditory warning message responsive to one or more of: second vehicle speed, second vehicle initiating a turn, second vehicle yaw rate and/or turn rate, and/or second pedestrian distance to the vehicle. In some embodiments, the pedestrian alarm system is configured to issue a third auditory warning message via at least one of the first speaker or other speaker responsive to one or more of: third vehicle speed, third vehicle initiating a turn, third vehicle yaw rate and/or turn rate, or third pedestrian distance to the vehicle.

The system according to the present invention can issue auditory and visual alerts to vulnerable road users (VRU) that are in potentially harmful proximity to a moving vehicle. The system receives warning triggers from an external source either through a CAN communication or through digital triggers. Once the system receives a warning input, it can determine which (if any) speakers and strobe lights are to issue an auditory/visual warning.

In some embodiments, auditory warnings outputs can be played through the left, center, or right speakers/RCA outputs depending on which warning commands are received. The system according to some embodiments can have beneficially one or more of four different layers (or levels) of warnings: (1) Turning Warning, (2) Blue Warning, (3) Yellow Warning, and (4) Red Warning. Each of the warning layers can have one or more corresponding audio message files. These audio files can be stored in memory card and can be played using the audio codec chip via SPI communication.

Volume of the auditory messages can be controlled, for example, digitally and/or through an adjustable potentiometer controlled by, for example, a volume knob. In some embodiments, the system may be configured to detect ambient noise and adjust the volume according to the amount of background noise. In some embodiments, the system may be configured to use geo-sensing to adjust the volume louder or quieter depending on the specific neighborhood, characteristic of a neighborhood (e.g., commercial versus residential, commercial retail versus commercial office), characteristic of the road (e.g., private versus public, multi-lane versus single lane, and/or speed limit), current traffic conditions, and/or time of day the vehicle is in.

Visual warnings outputs can be issued on back, left, center, front and/or right using, for example, strobe lights or other visual warning. When a visual warning is issued, the strobe light can alternate on/off at a predetermined frequency.

Various embodiments for a detection system, such as a pedestrian detection system or other object detection and/or avoidance system for a vehicle, and various embodiments for a method of use thereof, are provided. The system includes a plurality of sensors configured to detect pedestrians around the vehicle, and a plurality of alarms corresponding to the plurality of sensors, configured to alert a driver if the vehicle is at risk of colliding with a pedestrian. The plurality of sensors includes one or more front sensors configured to detect pedestrians in the front or substantially front area of the vehicle, one or more left side sensors configured to detect pedestrians along the left or substantially left side of the vehicle and one or more right side sensors configured to detect pedestrians along the right or substantially right side of the vehicle. The vehicle may include, for example, a large passenger vehicle such as a commuter bus, a school bus and/or truck, and the sensors may include, for example, sensors within cameras or other devices and/or sensor devices. As used herein, the pedestrian may include, for example, a cyclist.

In some embodiments, the system and/or method resolves intersectional issues. For example, with respect to left turns of the vehicle, the system and/or method detects a pedestrian crossing the street parallel but in the opposite direction the bus is traveling that is potentially hidden from view by, for example, the pillar or lost from view as a result of driver distraction. In addition, the system and/or method detects a pedestrian crossing the street parallel and in the same direction of travel that can be hit by the left side of the body of the bus as it turns. Again, the pedestrian is potentially hidden from direct view of the driver and the system/method is able to detect the pedestrian and notify the driver and/or perform a corrective action.

In some embodiments, with respect to right hand turns of the vehicle, the system and/or method detects a pedestrian crossing the street parallel and in the same direction as the bus is starting its turn. The right side of the bus can "track" into the pedestrian and knock them down, with the pedestrian possibly being run over by the vehicle. The system and/or method detects the pedestrian and alerts the driver and pedestrian and/or initiates a corrective action. In some embodiments, the system and/or method detects the pedestrian and alerts the driver and the pedestrian when the pedestrian is traveling in the opposite direction, similar to the detection of the left hand turn of the vehicle.

In some embodiments, a system and/or method includes two or three cameras/sensing devices placed strategically on the interior of the bus on the windshield. For example, the cameras/sensing devices may comprise one or more detector systems that provide features such as lane departure warning, headway monitoring, collision avoidance, sign reading and/or pedestrian detection. In some embodiments, the cameras/sensing devices placed at either side of the windshield are set up with an angular tilt towards the corners or A Pillars of the vehicle (e.g., a 45 degree view with respect to the driver) to capture a view of pedestrians disembarking in the crosswalk at the opposite side of the intersection as the bus or vehicle starts either a left or right turn. These side or angular cameras/sensing devices may optionally have basic functions of the detector system turned off in a default state and only activate a pedestrian detection feature and be programmed specifically for a predetermined range of coverage specific for turning situations as described below in more detail. In addition, these side angular cameras/sensing devices can be advantageously mounted on the exterior of the vehicle/bus near the rear wheel on each side.

In some embodiments, the cameras/sensing devices are mounted to the exterior of the vehicle using robust housings to enable the cameras/sensing devices to perform "tracking" activities of the vehicle/bus during the turns. In some embodiments, the camera/sensing device housing comprises extruded aluminum for lightness and strength. The housing may include an adjustment mechanism with an incremental angular adjustment of, for example, 1 degree increments (e.g., via teeth engagement between housing and base) in the lateral plane. In some embodiments, the housing incudes an adjustment mechanism for the vertical direction, in addition to, or instead of, the lateral plane adjustment mechanism. The housing may comprise weather proofing, for example, to IP-69 rating, and is robust to withstand impacts of driving, washes and the like. In some embodiments, the housing includes a lens on the front made of, for example, glass. This glass may be treated with a hydrophobic coating so that water sheets off and does not leave marks or other image-distorting remnants or spots. The housing can also act as a heat sink by being in full contact with one side of the camera/sensing device and is used to hide wiring.

In some embodiments, the system and/or method resolves and/or detects danger zones around the vehicle. For example, in some embodiments, the intersectional layout of the cameras and/or sensing devices provides good detail on the possible presence of pedestrians in the crosswalk. The layout can enable the cameras/sensing devices to overlap detection/views for the possible pedestrian locations. For example, in some embodiments, the right side of the vehicle presents the situation where an unaware pedestrian, typically distracted by either modern technology like a phone, tablet or music device, enters the crosswalk as a bus alongside him starts making or is in the middle of making a right turn. The pedestrian, perhaps looking down at his device, keeps walking as the body of the bus "tracks" sideways during the turn and actually moves closer to the curb towards the pedestrian. Without the system and/or method of the present invention, the pedestrian may walk into the side of the bus, be knocked down and possibly have his/her body/legs end up under the bus and be rolled over by the rear wheels.

In some embodiments, the system and/or method resolves and/or detects danger zones including a forward blind spot on the left side of the vehicle where a pedestrian who disembarks from the curb and walks in a direction opposite the travel of the bus. Specifically, the pedestrian continues in the crosswalk and as the bus penetrates the intersection and starts the left turn, the pedestrian remains in a blind spot as he moves and the bus turns. The corner area defined by the pillar and neighboring parts of the bus come into contact with the pedestrian. The pedestrian is sometimes not in the blind zone but is actually visible yet is hit because the driver may be focusing on looking to his left after deciding to make the turn. Accordingly, the system and/or method detects and/or alerts the driver and/or pedestrian for these danger situations as well.

In some embodiments, the system and/or method provides a graphic driver interface with a series of readouts showing the presence of pedestrians along with audible alerts. These readouts are distributed in order around the cockpit to present the alert in conjunction with direction the driver is looking at the time. For example, in some embodiments, the left side readout is mounted to the left A pillar or B pillar near the left mirror where the driver might be looking during a left turn and similarly for a right turn. In some embodiments, a center readout includes a combination of oversized pedestrian graphic and a readout for collision alerts, lane departure warning and/or headway monitoring and the like.

In some embodiments, the system and/or method provides audible alerts placed near the visual alerts or more strategically near the drivers head to present an increased directional awareness of the location of the danger. Outputs from the system can also be made in the form of seat vibration and/or other forms of awareness such as seat headrest speakers, and the like. In some embodiments, a graphic driver interface is provided in two visible stages: the system has awareness and warning stages. For example, the pedestrian is lit in yellow/amber on a corresponding display for awareness of a pedestrian in range of the danger zone. The system turns to red on the display and warns audibly if it calculates that the pedestrian and bus are on a collision course. This calculation is based on a determination that the speed of the bus and trajectory of the pedestrians movement that the "time to collision" (TTC) is falling within the preset threshold or other criteria indicating that a collision is possible or probable.

In some embodiments, the system and/or method advantageously avoids or minimizes false positives. A false positive is a detection warning when no risk is present. The system parameters are set to be balanced between sensitivity and realism/practical considerations. That is to say, the wider the area of coverage and sensitivity, the greater the sensing during normal driving that will lead to false positives. Driving straight with a side facing camera and/or sensing device can lead to false positives when the cone of coverage is too wide. The system and/or method determines and/or estimates TTC and eliminates/reduces false positives by cutting off the side cameras and/or sensing devices above a preset speed, for example, 12-15 mph based on trajectories that, given the increased speed of straight travel, may become too inclusive and cognizant of pedestrians even 15-20 feet away alongside the bus.

In some embodiments, the system can provide simulated or emulated internal combustion engine noise for a vehicle (e.g., electric vehicle applications or other applications where the vehicle operation is not sufficiently loud) when a pedestrian is detected within a predetermined distance from the vehicle, or when the vehicle is within a predetermined distance from an intersection or crossing, to provide a familiar warning or sound (e.g., emulated internal combustion engine noise) for the pedestrian.

In some embodiments, some triggers/conditions described herein can be used to warn both the driver and the pedestrian while some other triggers/conditions can be used to warn the pedestrian or driver exclusively.

Additional, alternative and/or optional features and advantages are described further below. This summary section is meant merely to illustrate certain features of the invention, and is not meant to limit the scope of the invention in any way. The failure to discuss a specific feature or embodiment of the invention, or the inclusion of one or more features in this summary section, should not be construed to limit the invention as claimed.

BRIEF DESCRIPTION OF THE DRAWINGS

The foregoing summary, as well as the following detailed description of preferred embodiments of the assembly, will be better understood when read in conjunction with the appended drawings. For the purposes of illustrating certain aspects of the present invention, preferred embodiments are shown in the drawings. It should be understood, however, that the assembly is not limited to the precise arrangement, structures, features, embodiments, aspects, and methods shown, and the arrangements, structures, features, embodiments, aspects and methods shown may be used singularly or in combination with other arrangements, structures, features, embodiments, aspects and methods.

The drawings are not necessarily drawn to scale and are not in any way intended to limit the scope of the invention, but merely to clarify various exemplary embodiments of the invention.

FIG. 22 is an exemplary circuit configuration for an audible alert system according to some embodiments.

DETAILED DESCRIPTION

With reference to the above-described drawings, various embodiments of the invention are described below.

Particular challenges arise when large vehicles such as buses enter an intersection to make a left hand or a right hand turn. For example, for left hand turns, a pedestrian crossing the street parallel with the bus but in the opposite direction of the bus's travel is potentially hidden from view by the bus's pillar or lost from view as a result of driver distraction. A pedestrian crossing the street parallel with the bus and in the same direction of travel can be "tracked" over by the left side of the body of the bus as it turns. Again, the pedestrian is hidden from direct view of the driver and can only be potentially seen in the mirror if the driver happens to look. For right hand turns, the primary pedestrian risk occurs as the pedestrian crosses parallel and in the same direction as the bus, as the bus starts its turn. The right side of the bus "tracks" into the pedestrian and knocks him down, with a potential catastrophe occurring if the rear wheels roll over the pedestrian. An impact can also occur with a pedestrian crossing the street parallel but in the opposite direction of the bus's travel, though this type of impact is less likely during a right hand turn than during a left hand turn. In some embodiments, the system can detect pedestrians in these situations, which are potentially hidden from the driver's view, and alert the driver and the pedestrians to avoid potential accidents.

Figure 1:
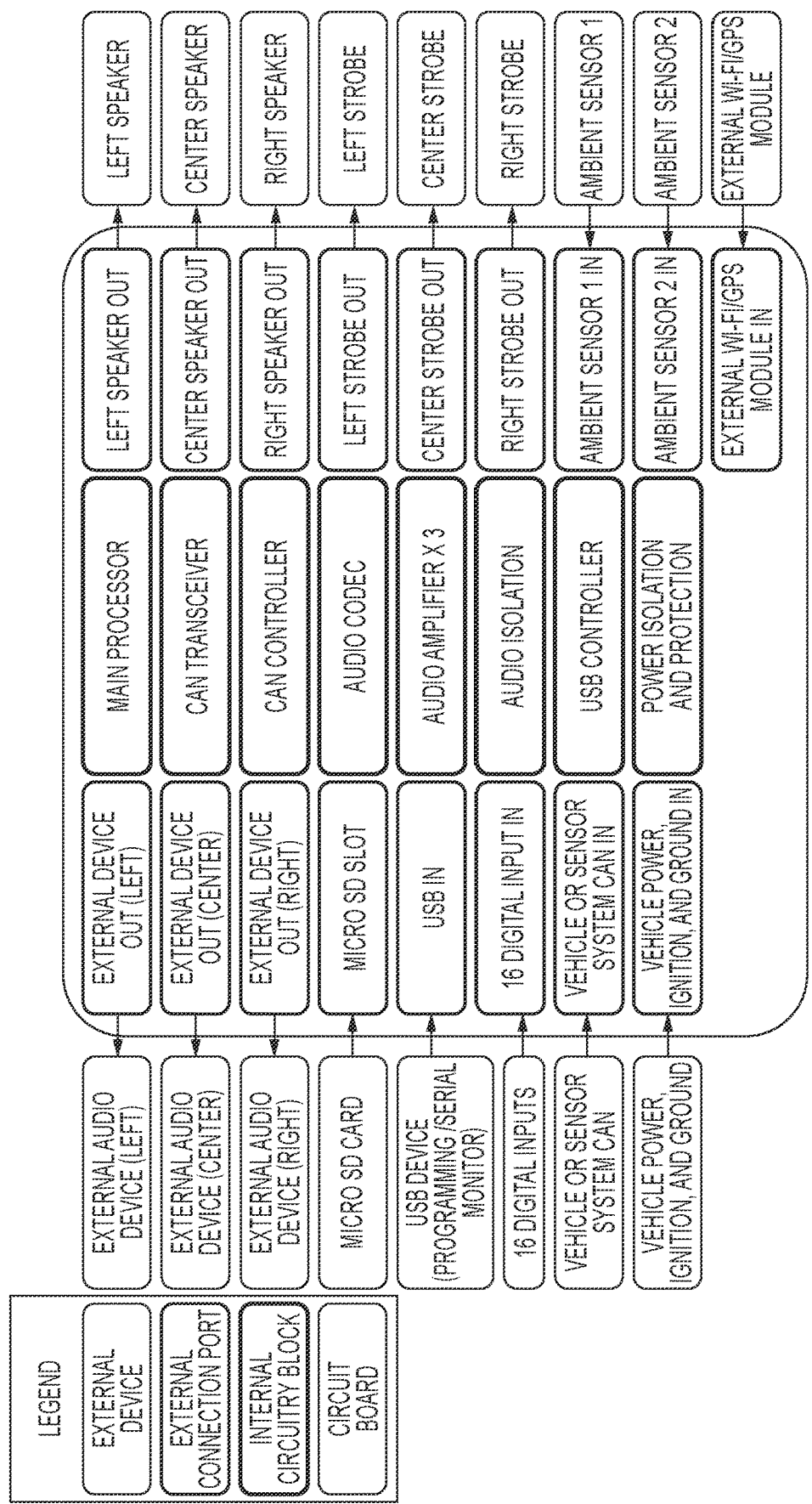
FIG. 1 is a block diagram of a pedestrian alert and/or pedestrian collision avoidance system according to some embodiments.
Figure 22:
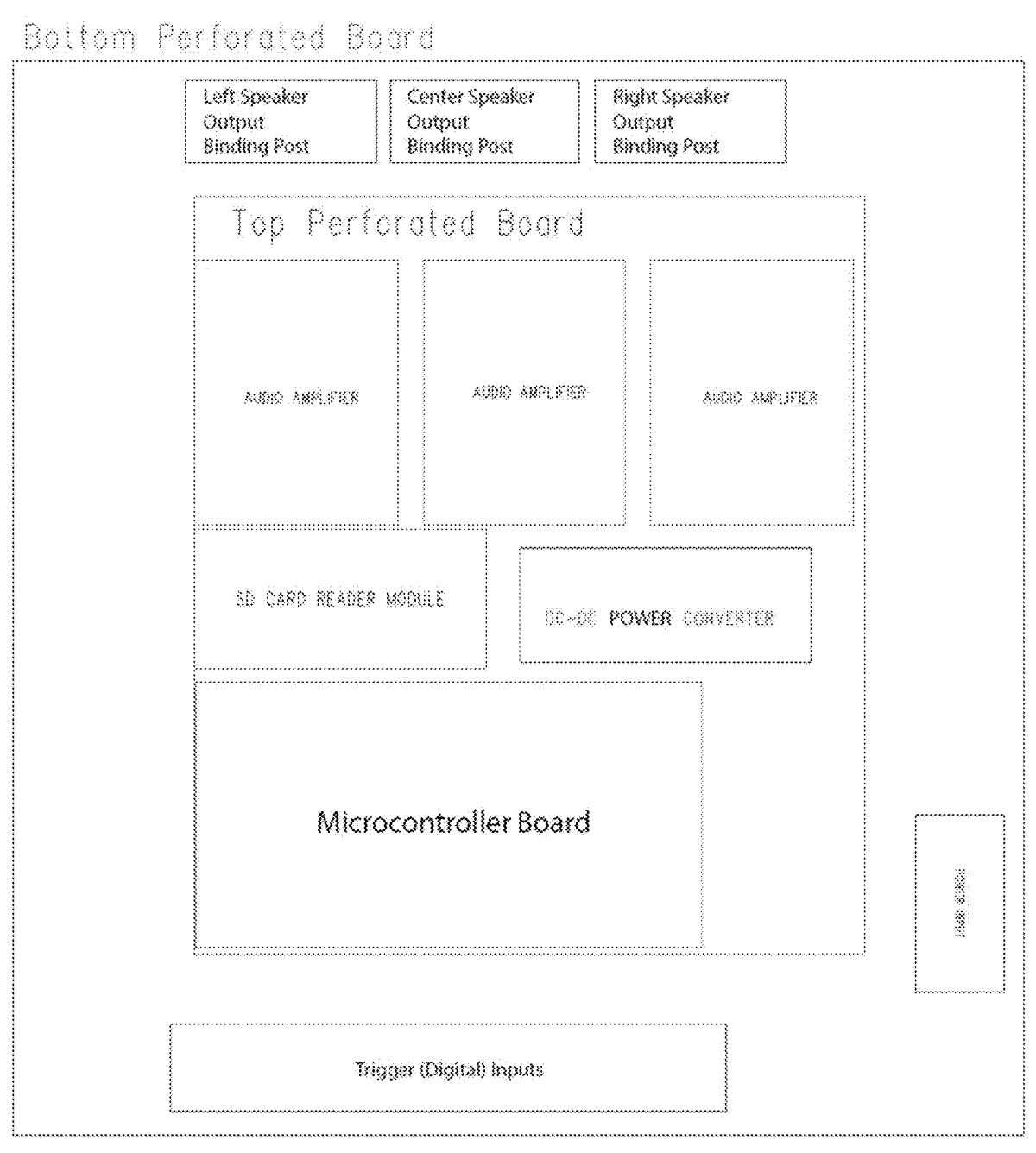

FIG. 1 is a block diagram of an exemplary pedestrian alert and/or pedestrian collision avoidance system according to some embodiments. When the system determines that an event has occurred, for example, that a hazard or pedestrian is in a danger zone or on a collision course with the vehicle, in some embodiments, the system determines where the hazard or pedestrian is located and triggers one or more alarms, such as a driver alarm and/or an external alarm corresponding to the location of the hazard or pedestrian. In some embodiments, multiple detection systems are used that may partly or substantially overlap areas for detection of an event. In some embodiments, the detection systems operate independently and detection by one system does not influence or affect detection by another system. In some embodiments, the system generates an alarm when more than one detection system determines an event. In some embodiments, the interior and/or exterior warning systems outputs the warning of highest urgency when multiple warnings are determined by one or more detection systems. In some embodiments, the interior and/or exterior warning system output separate warnings and/or are not coordinated. In some embodiments, the interior and/or exterior warning systems are independent of each other. The vehicle is sometimes described herein as a bus, such as a commuter bus, however, the present invention will be useful to any truck or vehicle, including a passenger vehicle such as a school bus, van, minivan, SUV, RV, or automobile. The hazard may include, for example, a pedestrian, a possible collision with the pedestrian, an anticipated collision with the pedestrian, an object, object detection, vehicle detection, cyclist detection, pedestrian detection, potential collision avoidance, and/or potential collision detection. In some embodiments, for overlapping area, an event is determined when both detection systems detect a potential event. FIG. 22 is an alternative exemplary circuit configuration for an audible alert system according to some embodiments.

Referring to FIG. 1, the exemplary pedestrian alert and/or pedestrian collision avoidance system according to some embodiments of the present invention may include a set of circuitry blocks or modules blocks that can be installed on one or more circuit board. In addition, the system may comprise a set of external devices and a set of external connection ports for connecting the circuitry blocks and the external devices.

The set of circuitry blocks may comprise a main processor, a controller area network (CAN) transceiver, a CAN controller, an audio codec, three audio amplifiers, an audio isolation, a USB controller, and a power isolation and protection.

The main processor can be a standalone general purpose microprocessor or microcontroller. Alternatively, the main processor may comprise more than one microprocessor or microcontroller. The main processor can be used to read the inputs (CAN communication, USB, ambient noise sensors, potentiometer), process the logic (USB processing, alarm timing, SD card reading), and control the outputs (audio outputs, strobe light).

A controller area network (CAN) is typically a two-wire, half-duplex, serial network used to provide communications between network nodes without a host computer. The CAN transceiver can interface between the CAN controller and the physical wires of the CAN bus lines. In addition, the CAN transceiver can be used to process the CAN communication that is sent from the vehicle's electronic control unit.

The audio codec (coder-decoder) can be a device or software program for encoding and decoding audio signals. The coder can encode an audio signal for transmission or storage and the decoder function reverses the encoding for playback or editing.

The audio amplifiers can be used to amplify low-power electronic audio signals to a level that is high enough for driving speakers that will be discussed in more detail hereafter. The amplifier may comprise, for example, three separate amplifiers or one amplifier with three channels. The power level can be set as needed. The amplifier is preferably powerful enough to drive a loud speaker that can cut through a noisy city environment. In some embodiments, loudness may be similar to a truck horn or equivalent (e.g., about 50-150 Watts). The amplifier line level input is compatible with the audio storage and playback unit. Input preferably has enough head room to avoid any harmonic distortions. Speaker level outputs are compatible with the external loud speakers. Output preferably has enough headroom to prevent harmonic distortion. The amplifier may comprise, for example, a Stereo 10 W/20 W Class D Audio Amplifier. This board may be powered at 5-12 VDC and can preferably drive two 4 Ohm channels at 20 W each, and two 8 Ohm channels at 10 W each. In some embodiments, each amplifier module is configured to drive a single 8 Ohm speaker at 10 W, using approximately 2 A of input current. In some embodiments, one Stereo 10 W/20 W Class D Audio Amplifier is provided for each of the three speakers. Three amplifiers can be used to independently control both the volume and activity of the left, center, and right channel speakers. In some embodiments, the volume may be controlled digitally, either muting or driving the speaker with the appropriate audio file depending upon the input triggers.

The audio isolation can be used to block the path that sound can travel through by using available techniques.

The universal serial bus (USB) controller can be used in supporting USB features. A USB type B connector can be used to update the main processor's program. the USB controller can be used to process USB data.

The power isolation and protection can be achieved by having protection devices to protect the power systems from faults by isolating only the components that are under fault, whilst leaving as much of the network as possible still in operation.

It is to be understood that other standard components can be used and/or one or more components can be incorporated into or removed from the set of circuitry blocks.

The set of external devices may comprise a left speaker, a center speaker, a right speaker, a left strobe or light, a center strobe or light, a right strobe or light, a first ambient sensor, a second ambient sensor, an external Wi-Fi/global positioning system (GPS) module, a left external audio device, a center external audio device, a right external audio device, a flash memory card, a USB device, 16 digital inputs, a vehicle or sensor system CAN, and a vehicle power, ignition, and ground. Additional and/or fewer internal and/or external devices may optionally be used.

Each of the left, center, back and/or right speakers can be connected to one or more amplifiers through a speaker output port. Each of the left, center, back and/or right interior/external audio devices can be an RCA output and can be connected to one or more of the external devices through an external device output port. Accordingly, the system provides alternative options to issue auditory warnings. The first option is to have three 4Ω speakers each driven by a 25 W audio amplifier. The second option is to have three line-out RCA connectors that will connect directly to the bus or truck's PA system. Alternative configurations to issue auditory warnings can also be used.

The speakers' power level can also be set as needed. In some embodiments, when applied with 10 W, the speakers are calculated to have a Sound Pressure Level (SPL) of 90 dB when measured 10 m away. This meets an exemplary specification of 90-100 dB at a distance of 10 m. The speakers are preferably to provide enough clarity and fidelity to understand a human voice at high volumes. In some embodiments, only the middle and treble frequency ranges may be emphasized (e.g., about 500 to about 3000 Hz). These frequency ranges are easier to drive at loud volumes and require less energy.

Each of the left strobe, center and right strobes can be connected to circuit board through a strobe output port. The system can issue visual warnings via these strobe lights. The strobe lights can strobe at a frequency of 4 Hz. Alternative visual warnings and/or additional visual warnings can be used.

Each of the first ambient sensor and the second ambient sensor can be a microphone for receiving environmental noise around the vehicle and pass the information to the circuit board through an ambient sensor input port. The system can interface to two external microphones. These microphones are used to sense the ambient noise surrounding the vehicle and thus dynamically control the volume of both the speakers and RCA out lines. Alternative ambient sensors can also be used.

The vehicle or sensor system and 16 digital inputs can comprise one or more image sensors, LIDAR detectors, cameras, recorders or other detection systems for capturing objects around the exterior or interior of the vehicle.

An external Wi-Fi/Global Positioning System (GPS) module allows the system to detect a Wi-Fi signal and to activate/deactivate with Wi-Fi and/or GPS systems.

The flash memory card can be a SD card which can be used to select the specific audio files to be played when warnings are issued. The SD card can interface to an audio codec, which can decode both .wav and .mp3 files.

The vehicle power can be an isolated power supply to provide, for example, 24V to the system from either a 12V or 24V vehicle battery. Further one or more DC/DC converters can be used to provide power to the audio amplifiers, and to the remaining on-board circuitry. In addition, the DC-DC converter can also connect to the controller and the audio codec circuit. In some embodiments, the system may include an evaluation board that provides several options for making input power (Vin and GND) and output load (Vout and GND) connections.

It is understandable that one or more external devices can be incorporated into or removed from the set of external devices. For example, an accelerometer and/or a gyro sensor can be provided to sense data regarding a driving characteristic of the vehicle. Image sensors can optionally be provided to detect hazard near the vehicle. In addition, an optional volume control knob (e.g., configured by potentiometer) can be provided to control the volume of the speakers/RCA outputs.

Figure 2:
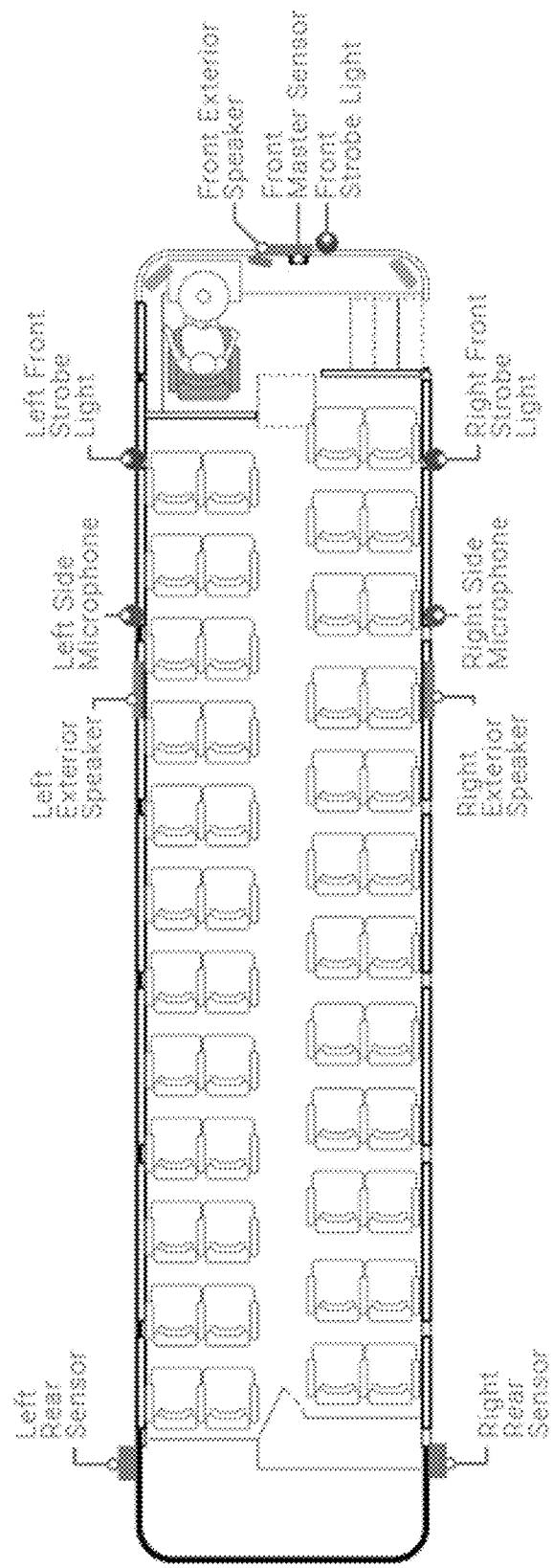
FIG. 2 is a schematic depicting a 40' transit bus equipped with the pedestrian alert and/or pedestrian collision avoidance system according to some embodiments.
Figure 3:
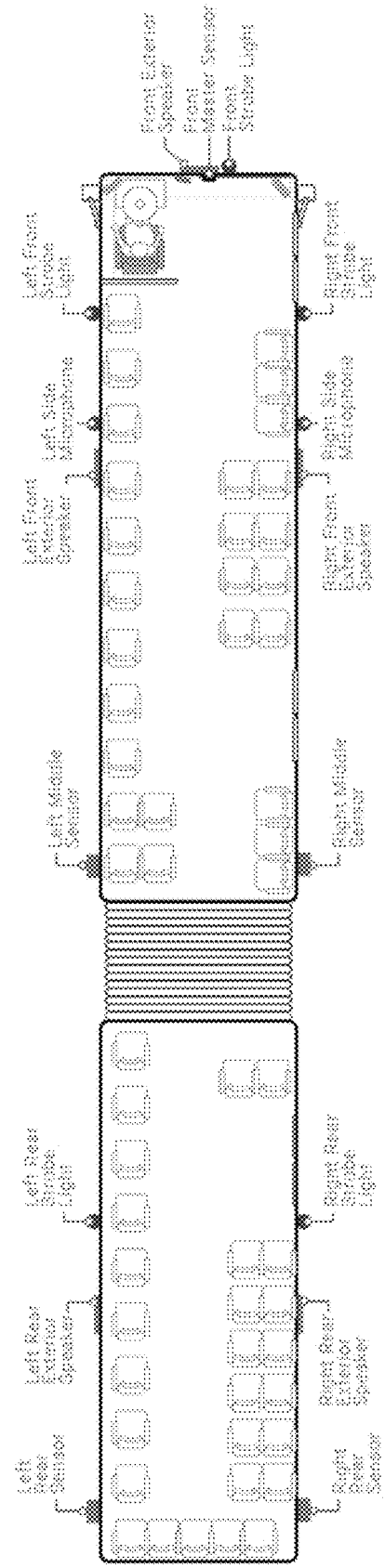
FIG. 3 is a schematic depicting a 60' articulating transit bus equipped with the pedestrian alert and/or pedestrian collision avoidance system according to some embodiments.

FIG. 2 is a schematic depicting a 40' transit bus equipped with the driver/pedestrian alert and/or pedestrian collision avoidance system according to some embodiments. FIG. 3 is a schematic depicting a 60' articulating transit bus equipped with the driver/pedestrian alert and/or pedestrian collision avoidance system according to some embodiments. The driver/pedestrian alert and/or pedestrian collision avoidance system issues auditory and/or visual alerts to vulnerable road users that are in potentially harmful proximity to the vehicle.

Exemplary locations for installing the speakers, strobes, microphones, sensors are indicated in FIGS. 2 and 3. In some embodiments, three speaker/visual light/strobe outputs and three RCA outputs can be presented on the system allowing for an array of sound output options. In some embodiments, a standard 40' transit vehicle can have one speaker/visual light/strobe on each side of the bus with a total of two speakers to function as an advanced turn warning system for pedestrian awareness. In some embodiments, a standard 40' transit vehicle can have one speaker/light/strobe on each side of the bus as well as the front of the bus with a total of three speakers. As an example application, the front speaker/light could alert an unaware person exiting a car door as the vehicle approaches. In some embodiments, an articulating transit vehicle can have two speakers and/or lights/strobes on each side of each rigid section of the bus and one speaker and/or lights/strobes on the front of the bus with a total of five speakers. In some embodiments, one speaker and/or light can be placed internal to the vehicle for discrete alerts to the vehicle operator. In some embodiments, the RCA outputs can be connected to existing vehicle PA systems to minimize cost and installation time. In some embodiments, including for example, a 60' articulating transit bus additional speakers and/or light/strobe emitters can be provided. For example, in some embodiments, left front, left back, right front, right back, front and back detectors, speakers and/or light emitters can be provided. In some embodiments, left front, left middle, left back, right front, right middle, right back, front and back detectors, speakers and/or light emitters can be provided.

In some embodiments, a plurality of sensors is mounted at various locations on and/or in the vehicle. It is understandable that various suitable locations can also be used for installation of the external devices.

In some embodiments, the system receives warning triggers from the vehicle or sensor CAN. In other embodiments, the system receives warning triggers from the 16 digital inputs or other number of inputs. Once the system receives a warning input, it determines which (if any) speakers and strobe lights are to issue an auditory/visual warning. Auditory warnings outputs can either be played through, for example, the left, center, or right speakers and/or the RCA outputs depending on which warning commands are received. The Auditory warnings outputs can be pre-recorded and saved as audio files. These audio files can be stored in the flash memory card, or other storage means. The stored audio files can be played back, when selected, using the audio codec via, for example, a serial peripheral interface (SPI) communication. In some embodiments, 24-bit, 96 KHz sample rate audio files are used either on external storage media or internal storage.

In some embodiments, four different warning layers (or levels) are categorized: (1) Turning Warning/Alert, (2) Blue/Detection Vicinity Warning/Alert, (3) Yellow/Caution Warning/Alert, and (4) Red/Urgent/Imminent Warning/Alert. More and/or fewer warning layers may optionally be used.

Each of the warning layers is provided with one or more corresponding audio warning or alert messages that can be stored in the flash memory card. An audio storage and playback unit may comprise a circuit board that can store voice messages for playback. Separate means may trigger the playback of each voice message. Playback of the selected voice message can be configured to continue repeatedly while the activation signal for that message is present. The unit can play back either audio track upon predetermined trigger input. Audio storage media may comprise, for example, a removable form of digital media, such as an SD/Micro SD/USB storage device. In some embodiments, the audio storage and playback unit comprises a controller and an audio codec circuit. The controller can monitor inputs from the cameras/sensors that are active, and play, audio files from the SD reader on the audio codec circuit responsive thereto. The audio codec circuit can decode the audio files and output line-level signals to be amplified by individual 10 W/20 W audio amplifiers for each appropriate speaker.

In some embodiments, the system issues a turning warning/alert to the vehicle driver, pedestrians and/or the nearby road users when the driver is preparing to turn the vehicle left or to turn the vehicle right but not yet making any turn. For example, in some embodiments, the turning warning/alert is triggered when the vehicle's turn signal switch is turned on and the vehicle's speed is within a configurable and/or predetermined speed range and a nearby road user is detected to be within a predetermined distance from the vehicle. In some embodiments, the predetermined speed range is between 1 kph and 32 kph. In some embodiments, the predetermined speed range is between 1 kph and 16 kph. In some embodiments, the predetermined distance is 3 meters (low sensitivity). In some embodiments, the predetermined distance is 5 meters (high sensitivity). An exemplary audio warning message for the turning warning/alert can be "Caution, Bus Turning."

In some embodiments, the system issues a blue layer and/or in the vicinity warning/alert to the vehicle driver and the nearby road users when the vehicle starts to turn left or turn right, for example, when a bus is approaching a bus stop. In some embodiments, the blue layer warning/alert is triggered when: the vehicle's yaw rate and/or turn rate is within a predetermined yaw rate and/or turn rate range, the vehicle's speed is within a predetermined speed range and a nearby road user is detected to be within a predetermined distance from the vehicle. In some embodiments, the predetermined yaw rate and/or turn rate range is between −2°/s and −4°/s (indicating a left turn) or between +2°/s and +4°/s (indicating a right turn). In some embodiments, the predetermined speed range is between 1 kph and 32 kph. In some embodiments, the predetermined speed range is between 1 kph and 16 kph. In some embodiments, the predetermined distance is 3 meters (low detector sensitivity). In some embodiments, the predetermined distance is 5 meters (high detector sensitivity). An exemplary audio warning message for the blue layer warning/alert can be "Caution, Bus Approaching."

The system can issue a yellow or caution/potential threat/potential collision layer warning/alert to the vehicle driver and the nearby road users when the vehicle starts to turn left or turn right and a road user is detected by one of the cameras within a predetermined distance. In some embodiments, the yellow layer warning/alert is triggered when the vehicle's yaw rate and/or turn rate is within a predetermined yaw rate and/or turn rate range and the vehicle's speed is within a predetermined speed range and a nearby road user is detected by one of the rear cameras. In some embodiments, the predetermined yaw rate and/or turn rate range is between −2°/s and −4°/s (indicating a left turn) or between +2°/s and +4°/s (indicating a right turn). In some embodiments, the predetermined speed range is between 1 kph and 32 kph. In some embodiments, the predetermined speed range is between 1 kph and 16 kph. An exemplary audio warning message for the yellow layer warning/alert can be "Danger, Step Back."

The system can issue a red layer or urgent warning/alert to the vehicle driver and the nearby road users when the vehicle detects critical pedestrian proximity. In some embodiments, the red layer warning/alert is triggered when the vehicle's yaw rate and/or turn rate is within a predetermined yaw rate and/or turn rate range and the vehicle's speed is within a predetermined speed range and a nearby road user is detected by one of the rear cameras. In some embodiments, the predetermined yaw rate and/or turn rate range is between −2°/s and −4°/s (indicating a left turn) or between +2°/s and +4°/s (indicating a right turn). In some embodiments, the predetermined speed range is between 1 kph and 32 kph. In some embodiments, the predetermined speed range is between 1 kph and 16 kph. An exemplary audio warning message for the red layer warning/alert can be "Danger."

In some embodiments, volume output of each speaker is up to 100 dB at 10 feet. In some embodiments, the system can self-adjust output volumes and/or usage of speaker based on ambient noise level of the environment. The system can detect ambient noise generated by the external environments around the vehicle by, for example, the microphones and decide the volume of the audio warning messages to be played from the speakers or specific speakers so that the volume is load enough only to warn the road users. In some embodiments, two external microphones monitor decibel level in the vicinity of the vehicle. In some embodiments, one or more microphones are used. The system then averages the two values and adjusts volume output accordingly. In some embodiments, the volume of the audio warning messages is 10 dB loader than the ambient noise. In some embodiments, the volume of the audio warning messages is 10% louder than the ambient noise. Thus, the volume of the audio warning messages is louder in noisier environments (e.g., commercial areas) and quieter in quieter environments (e.g., residential or suburban areas).

In some embodiments, the volume of the audio warning messages can also be adjusted manually. For example, the volume of the auditory warning messages can vary based on the volume knob installed in the vehicle.

The audio warning messages can be in different languages depends on the country or geographic locations in a specific country/location the vehicle is used. For example, when the vehicle is detected of entering an area where the majority of the spoken language is not English, the audio warning messages can be played in the language that is the majority of the spoken language in that area, in addition to or instead of the English language.

In some embodiments, the system provides one or more visual warning/alerts in addition to audio warning/alert. In some embodiments, visual warnings outputs are issued on, for example, either left, middle, left, middle right, center, or right strobe lights. In some embodiments, the strobes or other light emitting device can flash at one or more predetermined patterns and/or with predetermined durations. In some embodiments, the flashing rate is 4 Hz. In some embodiments, more than one strobe and/or other light source can be chained together to provide a vast array of one or more light sources.

One example of scenarios for the system is when a transit bus equipped with the collision detection and/or avoidance system approaches a bus stop that is veering towards a group of pedestrians on the sidewalk at or near the bus stop, for example to pick up passengers. In this scenario, the system could recognize that the vehicle is approaching a bus stop and alert the pedestrians appropriately. Visual warnings outputs can also or instead be issued using for example, either left, center, or right strobe lights or other light source.

Each level of exterior alert can have an optional configurable predetermined timeout in seconds. This can be implemented after an alert of a certain level, when a pre-configured time period is completed before the system can generate another alert of the same level. The alert timeouts can be configured as independent per side of the vehicle. For example, an alert announcement/visual display on the right side of the vehicle will start a timer with predetermined timeout for the event on the right side, and the left side of the vehicle will remain available for the alert. In some embodiments, the pre-configuration for "Turning" warnings is set to a 15 second timeout for both sides of the vehicle, and a timeout generated on one side will start the timeout for both sides. In some embodiments, the pre-configuration for the "Blue" of vicinity/near potential collision warning timeouts is set to a 10 second timeout for each side of the vehicle, and a timeout generated on one side will not start the timeout for both sides. In some embodiments, the pre-configuration for the "Yellow" or caution warning timeouts are set to a 5 second timeout for each side, and a timeout generated on one side will not start the timeout for both sides. In some embodiments, the pre-configuration for the "Red" or urgent warning timeouts is set to a 0.5 second timeout for each side, and timeout generated on one side will not start the timeout for both sides. In some embodiments, this timeout is negligible and/or overridden, allowing or enabling the critical "Red" warnings to alert as long as there is a critical threat.

In addition to the timeouts for alerts of the same type, exterior alerts can advantageously also be prioritized. In some embodiments, the priority of exterior alerts is based on severity level of critical pedestrian proximity or critical/imminent collision with an object. Exterior alerts of lower priority can have their timeouts activated or overridden by higher priority events. For example, a "Red" or urgent warning triggers or overrides the timeouts for "Turning," "Blue," and "Yellow" alerts. In addition, exterior alerts of higher priority can interrupt or supersede alerts of lower priority. For example, a "Red" warning can interrupt or supersede a "Turning," "Blue," or "Yellow" alert. A "Yellow" warning can interrupt or supersede a "Turning" or "Blue" alert and start the lower priority event timeouts. A "Blue" warning can interrupt or supersede a "Turning" warning and starts or triggers the lower priority event timeout.

To eliminate or reduce multiple alerts playing at the same time from different speakers, or even the same alert playing from multiple speakers at different times, in some embodiments, the system can stop and synchronize the external alert according to the event with the highest priority. For example, a "Blue" or vicinity layer warning may be playing from the right speaker while the bus is turning right. A pedestrian may quickly approach the bus from the left side, triggering a "Red" layer or urgent warning on the left side of the bus. The system can stop, override or supersede the "Blue" layer warning and play the "Red" layer warning from both speakers at the same time. As another example, a "Blue" layer warning may be playing from the right speaker while the bus is turning right. A pedestrian may quickly approach the bus from the left side, triggering a "Yellow" layer or caution warning. The system can stop the "Blue" layer warning and play the "Yellow" layer warning from both speakers at the same time. As yet another example, a "Red" layer warning may be playing from the left speaker while the bus is turning left. A cyclist may quickly approach the bus from the right side, triggering a separate "Red" layer or urgent warning. The system can stop the first "Red" layer warning from the left side and play the "Red" layer warning from both speakers at the same time to prevent uncoordinated "Red" layer or urgent warnings from interfering with each other if not coordinated.

in some embodiments, the system is advantageously enabled for over-the-air (OTA) updates so that users can upgrade systems remotely, adjust parameters per vehicle routes, and access diagnostic messages. OTA updates can also update audible alert files and/or visual/light source operation. In some embodiments, an authorized user can update audio files remotely using the OTA feature. Diagnostic messages are optionally available for: overall system health status (e.g., system healthy/system fault), health status of CAN connection (e.g., connected/disconnected, healthy network/faults, receiving data/not receiving data), health status of memory card (e.g., functional/non-functional), health status of each speaker (e.g., connected/disconnected), health status of each microphone (e.g., connected/disconnected), and health status of each strobe (e.g., connected/disconnected).

The system can optionally provide simulated "Vehicle in Motion" sounds (e.g., electric vehicle applications or other applications where the vehicle operation is not sufficiently loud) when a pedestrian is detected within a predetermined distance from the vehicle to provide a familiar warning or sound (e.g., simulated or emulated internal combustion engine noise) for the pedestrian. In some embodiments, when the vehicle (e.g., electric vehicle applications or other applications where the vehicle operation is not sufficiently loud) is within a predetermined distance from an object, intersection and/or crossing, the system generates a sound or noise to warn nearby pedestrian. In some embodiments, the generated sound or noise is an emulation of noise generated by a typical internal combustion engine and is not indicative of a potential or immediately forthcoming collision but is configured to enable nearby pedestrians and drivers of other vehicles, bicycles, etc. to be cognizant of the presence of the vehicle whether slowing down, in current drive mode and/or speeding up. In some embodiments, this predetermined distance may be the same or different than triggers/conditions used to generate one or more alerts as described herein. For example, in some embodiments, the system will generate potential and/or imminent collision alerts in combination with the simulated and/or emulated alerts. In some embodiments, different alert tables or profiles are used that permit overlapping alerts. In some embodiments, some overlapping alerts are permitted while other overlapping alerts are not permitted. For example, in some embodiments, overlapping alerts are not permitted between imminent collision alerts and other alerts, while alerts other than imminent collision may overlap. In some embodiments, the system enables users selectively define alerts based on the same and/or different triggers or conditions. In some embodiments, the system uses CAN/J1939 vehicle speed messages to trigger external sounds indicating the vehicle is in motion. In some embodiments, the system can emit either continuous sound or bursts of sound at a configurable frequency, volume, and pattern when in motion and within any configured thresholds. The system can lower ("duck") or completely pause the "Vehicle in Motion" sound when pedestrian alerts are triggered. In some embodiments, the speed range thresholds are configurable.

The sound levels can be configurable per speed range, location, event, urgency (or other desired parameters). The sound files per speed range can be discrete and configurable. For example, in some embodiments, the system has configurable, incremental thresholds in which the speed alters the sound of the alerts. In some embodiments, when the vehicle speed is between 0.5 mph and 5 mph, the discrete sound file is at level 3 dB above ambient; when the vehicle speed is between 5 mph and 10 mph, the discrete sound file is at level 6 dB above ambient; when the vehicle speed is between 10 mph and 15 mph, the discrete sound file is at level 8 dB above ambient; when the vehicle speed is between 15 mph and 20 mph, the discrete sound file is at level 10 dB above ambient; and when the vehicle speed is between 20 mph and 25 mph, the discrete sound file is at level 12 dB above ambient. In some embodiments, when the vehicle speed is higher than a predetermined speed range threshold, no Vehicle in Motion is performed. In some embodiments, the predetermined speed range threshold is 25 mph.

In addition to the parameters indicated above, in some embodiments, a vision sensing system is included that increases the intelligence of, for example, the Vehicle in Motion alert which advantageously announces the vehicle is in motion after being stopped, providing an additional announcement layer. The presence of pedestrians detected in range of the vehicle can activate the Vehicle in Motion alert. Similarly, the lack of pedestrians detected around the vehicle at all or within a predetermined boundary can deactivate or avoid triggering the Vehicle in Motion alert. This option of preventing or avoiding the triggering of an alert is critical in reducing noise pollution in predetermined locations or areas where pedestrians are absent. In some embodiments, the system outputs Vehicle in Motion alerts when the vehicle speed is detected above a predetermined speed, such as 1 kph, and pedestrians are detected within a predetermined boundary or distance, such as 16 m, of the vehicle in one, multiple or any direction covered by the vision sensors or other detectors. The system can alternatively or in addition to, regulate the volume output of the Vehicle in Motion alert responsive to the potential usefulness or possible relevancy/collision according to an incremental range of predetermined thresholds or criteria.

In some embodiments, the system is equipped with CAN bus hardware and can be configured to give a distinct alert for any given CAN/J1939 message. In some embodiments, the system is equipped with a plurality of input triggers, such as 16 analog or digital input triggers, for connection to a variety of analog vehicle systems. For example, if the vehicle turn signals are not on the vehicle's CAN bus, an analog connection can be used to trigger a discrete and configurable external alert. Such connections can be made to door switches, reverse lights, marker lights, video camera triggers, light source triggers, mirror system triggers, operation of a vehicle triggers, etc., and can be configured for any number of desired alerts. In some embodiments, these analog triggers are in the form of brief pulses and the logic employs a latching mechanism to read the pulses. In order to respond to these triggers with the associated sounds, an audio codec circuit DSP evaluation board may be used to read from a microSD card to covert the audio file into line-level signals ready to be amplified. In some embodiments, different and/or predetermined triggers can be used as described herein. In some embodiments, the same or similar triggers may be used for the sound and the visual displays.

In some embodiments, the system includes self-disabling or suppressing capabilities when within pre-defined geofences or when detecting certain Wi-Fi SSIDs (Service Set Identifiers). This allows or enables the system to remain quiet or suppress announcements when detecting the Wi-Fi signal, for example, inside a transit depot, and would optionally allow for the system to reactivate when the vehicle exits the depot and escapes the range of the Wi-Fi signal. In some embodiments, the system activates/deactivates with GPS, Wi-Fi, and/or some redundant combination of technologies (to disable system or suppress announcements when in depots, for example).

In some embodiments, no overlapping messages, waveforms, etc. are played on any output. The system may be configured to allow one full message to be played on each speaker before playing any subsequent messages. For example, in some embodiments, if the "Yellow" message is being played and a "Red" layer warning is triggered, then the "Yellow" message is immediately stopped, and the "Red" message is played instead.

In some embodiments, some triggers/conditions (e.g., red layer warning/alert) described herein can be used to warn both the driver and the pedestrian while some other triggers/conditions (e.g., Vehicle in Motion alert) can be used to warn the pedestrian or driver exclusively. For example, in some embodiments, the system can optionally include a trigger/condition table or profile associated with the pedestrian and a separate trigger/condition table or profile associated with the driver where selective conditions and/or triggers can be used in determining different actions and/or alerts associated therewith. In some embodiments, overlapping triggers/conditions between the driver and pedestrian are not permitted, while overlapping alerts/triggers between the driver and pedestrian may overlap with some or all in other embodiments. In some embodiments, the system enables users selectively define triggers/conditions based on the same and/or different triggers or conditions for the driver and/or pedestrian using, for example, tables and/or profiles that are user specific.

Figure 4:
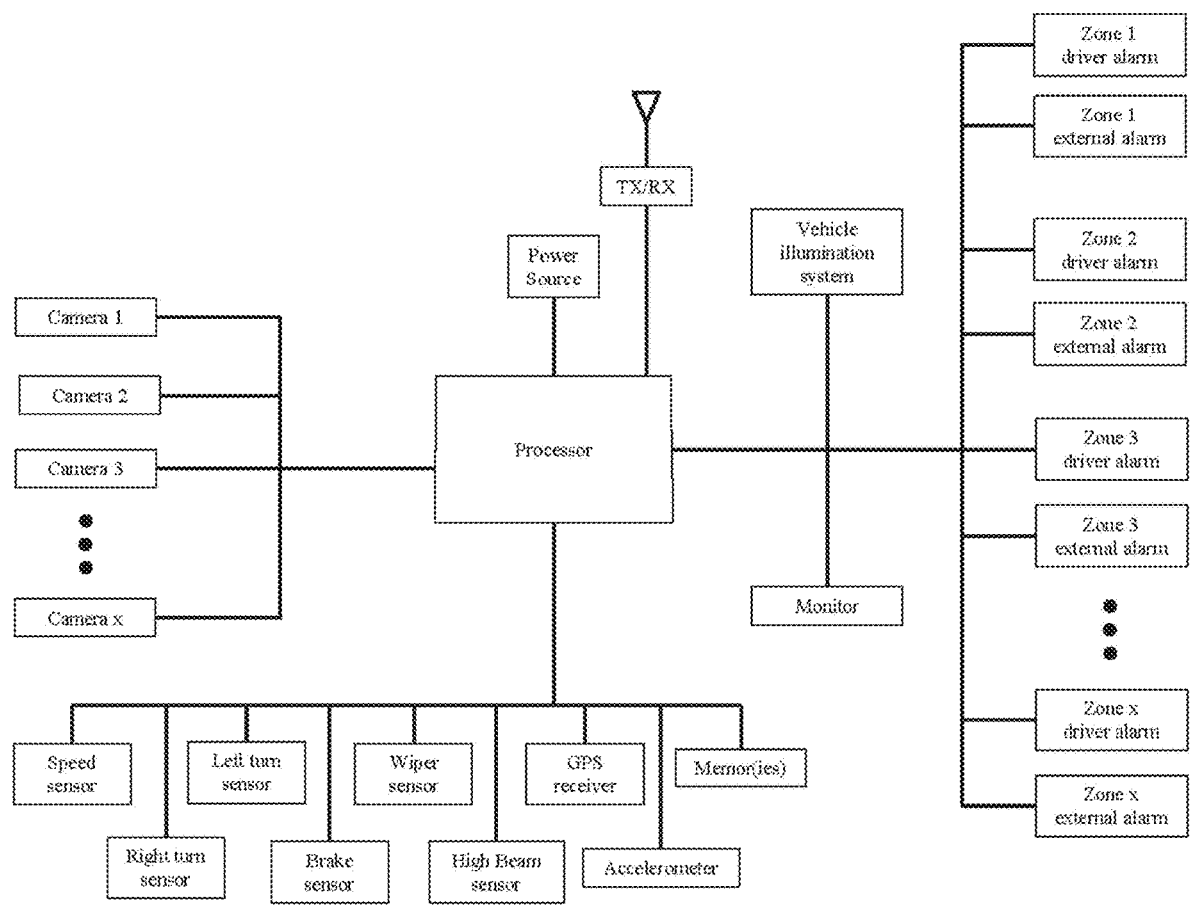
FIG. 4 is a schematic of a pedestrian detection system according to some embodiments.
Figure 5:
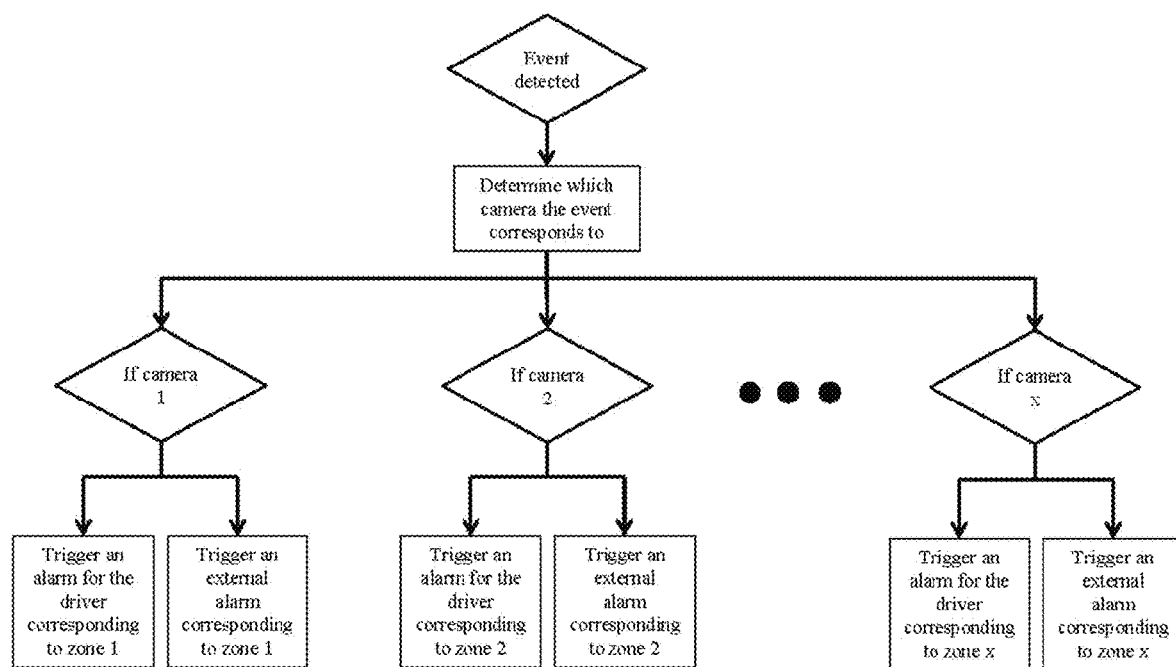
FIG. 5 is a flow chart depicting a pedestrian detection method according to some embodiments.
Figure 6:
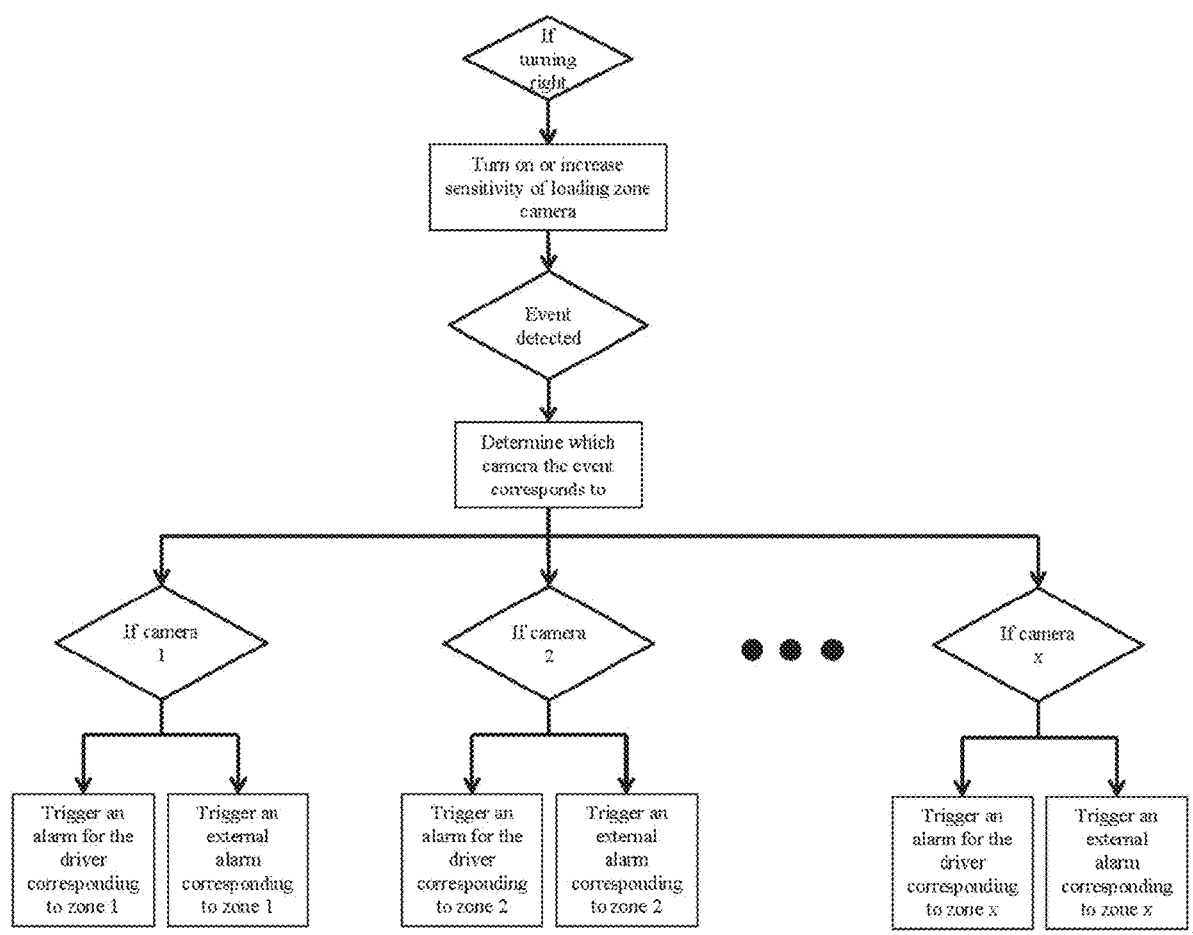
FIG. 6 is a flow chart depicting a pedestrian detection method according to some embodiments.

FIG. 4 is a schematic of a pedestrian detection system according to some embodiments. FIGS. 5 and 6 are flow charts depicting a pedestrian detection method according to some embodiments of the invention. When the system determines that an event has occurred, for example, that a hazard or pedestrian is in a danger zone or on a collision course with the vehicle, the system determines where the hazard or pedestrian is located and triggers one or more alarms, such as a driver alarm and/or an external alarm corresponding to the location of the hazard or pedestrian. The vehicle is sometimes described herein as a bus, such as a commuter bus; however, the present invention will be useful to any truck or vehicle, including a passenger vehicle such as a school bus, van, minivan, SUV, RV, or automobile. The hazard may include, for example, a pedestrian, a possible collision with the pedestrian, an anticipated collision with the pedestrian, an object, object detection, vehicle detection, cyclist detection, pedestrian detection, potential collision avoidance, and/or potential collision detection.

Referring to FIG. 4, a hazard detection system according to the present invention may include a plurality of cameras/sensors located at various locations on a bus and arranged and oriented to detect hazards such as pedestrians external to the vehicle. In some embodiments, the cameras/sensors are independent even though they may have some overlapping fields of view. The plurality of cameras/sensors may be communicatively coupled to one or more processors (depicted, e.g., in FIG. 4 as one block labeled "processor") that receive signals from the plurality of cameras/sensors and determine whether there is a risk of a collision. In some embodiments, there may be a processor for each camera/sensor, rather than one central processor that coordinates all of the cameras/sensors. In other embodiments, there may be a plurality of processors, but more than one camera/sensor may be associated with a single processor, for example, a first group of cameras/sensors may be associated with a first processor, and a second group of cameras/sensors may be associated with a second processor, and so on. The processors may be coupled to a power source and communicatively coupled to a plurality of driver alarms and/or warning devices that correspond to the location of the risk of collision. The driver alarms and/or warning devices may correspond to the plurality of cameras/sensors on a one-to-one basis. In other embodiments, multiple cameras/sensors may map to individual alarms and/or warning devices and vice versa. In some embodiments, the cameras and/or various situational sensors such as a speed sensor, a left turn sensor, a right turn sensor, a brake sensor, a wiper sensor, a high beam sensor, a GPS receiver and/or an accelerometer, and associated memory/memories are communicatively coupled to the processors. The processors may be communicatively coupled to a transmit/receive antenna, a vehicle illumination system and/or one or more monitors. In some embodiments, the data generated by one or more of the situational sensors are transmitted to one or more processors associated with one or more of the detectors/cameras/sensors or transmitted directly to one or more of the detectors/cameras/sensors to provide information used to determine whether to trigger the detection of the hazard and/or warning alarm and/or to provide information used to determine the sensitivity of the detectors/cameras/sensors when triggering the detection and/or warning alarm to avoid collision.

In some embodiments, the plurality of detectors/cameras/sensors includes multiple detectors/cameras/sensors communicatively coupled to one or more warning devices, optionally within the field of view of the driver when the warning device is visual as opposed to auditory. In some embodiments, a particular warning device is configured to issue a warning based on the detection of a hazard by a single detector/camera/sensor. In other embodiments, the warning device is configured to issue a warning only when two or more detectors/cameras/sensors detect the same hazard and/or detect multiple hazards in the same and/or adjacent danger zones. In some embodiments, the plurality of detectors/cameras/sensors may be communicatively coupled to a plurality of processors that are communicatively coupled to the one or more warning devices, and which determine when to issue a warning. For example, in some embodiments, the processors are configured to issue a warning when one or more detectors/cameras/sensors detects a hazard. Alternately, the processors may be configured to issue a warning only when two or more detectors/cameras/sensors detect the same hazard and/or detect multiple hazards in the same and/or adjacent danger zones.

The processors may receive inputs from one or more trigger signal indicators, for example, the shifting of the bus from a park gear to a first gear, the opening or closing of a vehicle door, the turning on or off of an amber or red flashing school bus light to indicate boarding/disembarking, or the like. The processors may also receive an input from a manual override, which allows a driver to control the cameras/sensors, monitors, external lighting, audible alerts and external warning devices or the like, for example, with a control console, by opening a vehicle door, or otherwise. An adjustable function timer such as a processor clock can be adjusted to provide timing signals to the processors and/or any controlled functions that require timing.

The processors may provide integrated control over the cameras/sensors, monitors, lighting, audible alerts, and other external warning systems of the vehicle. Accordingly, in some embodiments, the processors may control the ON/OFF state and operation of any camera/sensor and monitor systems, the ON/OFF state and operation of any vehicle illumination system including lighting strips and floodlights, the ON/OFF state and operation of any audible alert system including any driver alerts and/or any external vehicle alerts for pedestrians and passengers boarding or disembarking from the bus, and the ON/OFF state and operation of any auxiliary driver aids or other external devices, for example, a flashing amber or red bus light, a crossing gate or stop sign mounted from the exterior of the bus, or the like. For example, when the bus door is opened, a processor may receive a trigger signal from a trigger signal indicator, and the processor may then activate a passenger boarding mode, including turning on the red or amber flashing school bus lights, turning on a lighting strip, switching a monitor to display a camera/sensor feed, deploying the crossing gate mounted on the driver's side of the exterior of the bus, turning on an audible alert to inform pedestrians that it is safe to approach the bus or to cross the street, and the like. Similarly, the receipt of a signal indicating the bus door closing may cause the processor to output an alternate set of instructions.

The various processor connections, though illustrated as separate individual connections, may consist of a single signal bus or one or more interfaces that communicate via a wired or wireless connection with the systems that control the various system components. Additionally provide feedback signals or messages to the processors to indicate a receipt/non-receipt of a signal, a message or command, a failure or malfunction of the controlled system, a camera/sensor reading or other external condition, or the like. In some embodiments, a processor may control an automatic emergency braking mode, automatically engaging the vehicle brakes, for example, to avoid a potential collision.

The cameras and/or sensors used for hazard and/or pedestrian detection are generally a network of cameras and/or sensors, but may include any object detecting sensor or sensor system, including optical sensors, thermal sensors, proximity sensors, acoustic sensors, magnetic sensors or otherwise, and alone or in combination with one another. For example, an optical system may emit infrared, red or laser light, and the target breaks the light beam or reflects the beam back to the sensor to activate the sensor output. Likewise, a radar system may emit radio waves in a similar manner to determine the range, altitude, direction, or speed of objects.

In some embodiments, a plurality of cameras/sensors are mounted at various locations on a bus and oriented in such a way as to detect external hazards such as pedestrians. The cameras/sensors may be any type of camera and/or sensor that provides an instant signal responsive to objects in its field of view. For example, the cameras/sensors may be digital cameras that provide a real-time digital signal, via an associated processor, to a system display or speaker, optionally including, in some embodiments, to one or more monitors in the driver's cabin.

In some embodiments, the plurality of cameras/sensors includes one or more forward-view cameras/sensors positioned on the front of the vehicle. A forward-view camera/sensor may provide a field of view centered along the forward facing longitudinal axis of the vehicle, and may detect a potential hazard and/or collision in the forward direction of travel. The forward-view camera/sensor may be an interior camera/sensor or an exterior camera/sensor. The forward-view camera/sensor is preferably positioned to provide a field of view that includes any hazards or pedestrians, including children, pets, or other small objects, immediately in front of the vehicle. Any or all of the cameras/sensors may be positioned with a vertical angular orientation and directed toward the desired target area. Various camera/sensor orientations, locations and/or angles may be used.

Figure 10:
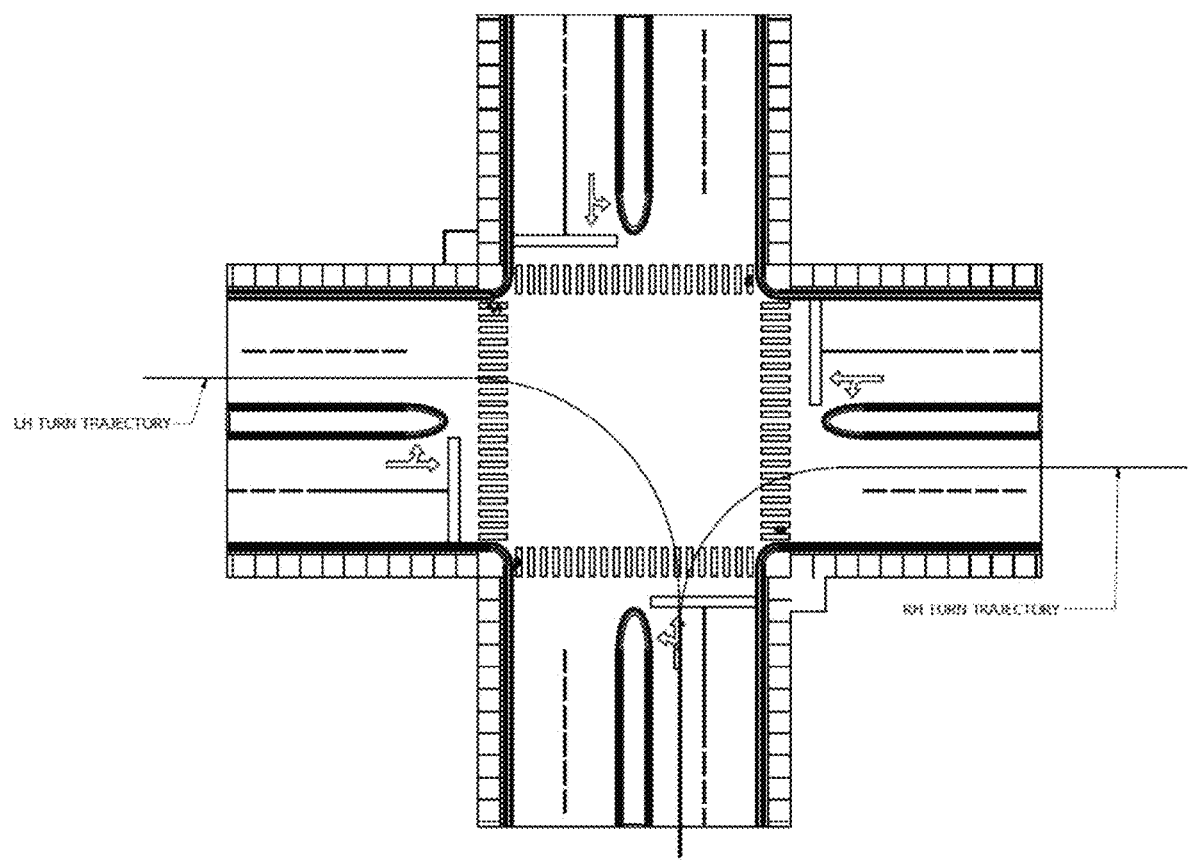
FIG. 10 is a top view of an intersection and left and right turn trajectories for a vehicle according to some embodiments.
Figure 11:
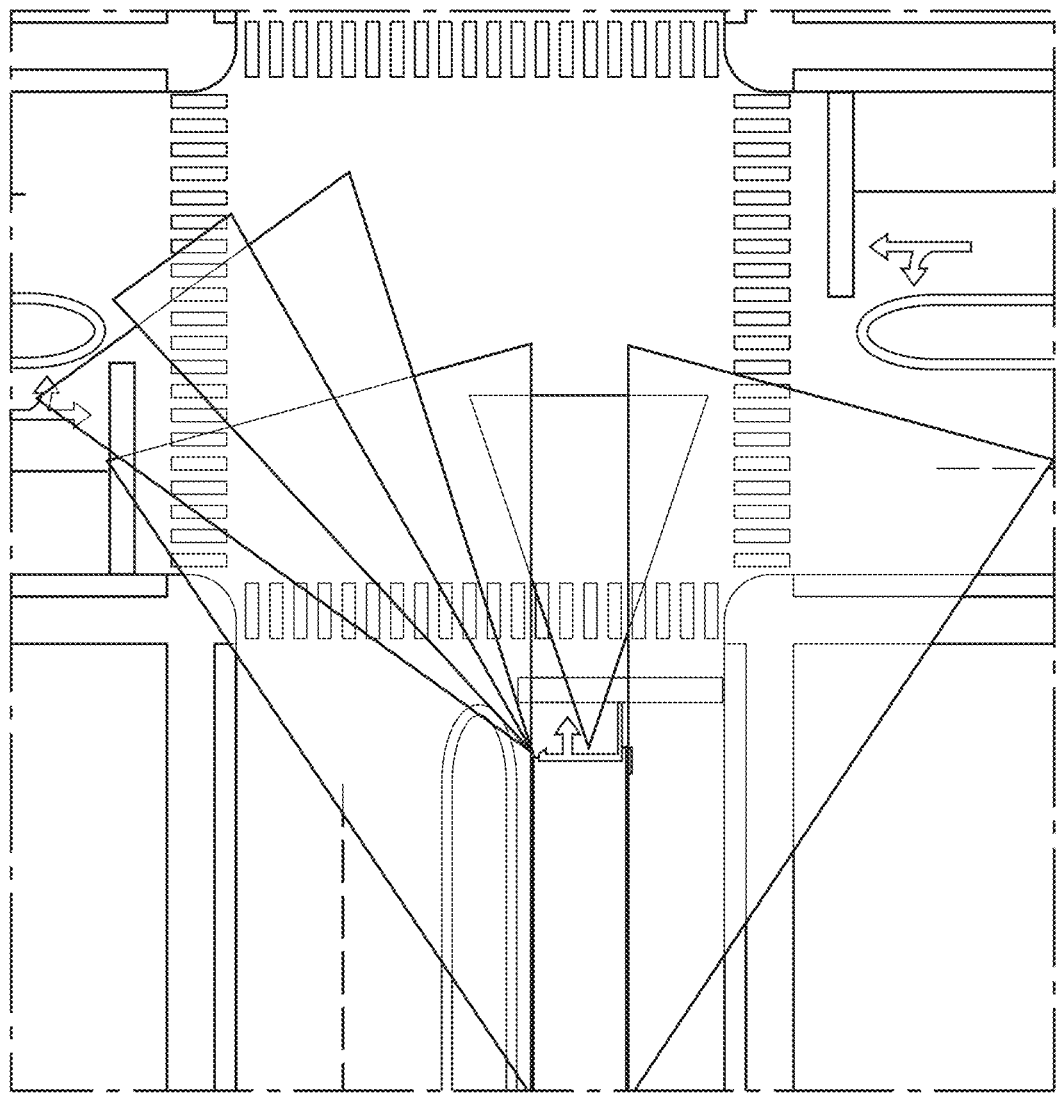
FIG. 11 is a top view of a vehicle with cameras/sensing devices and their fields of view in use according to some embodiments.
Figure 12:
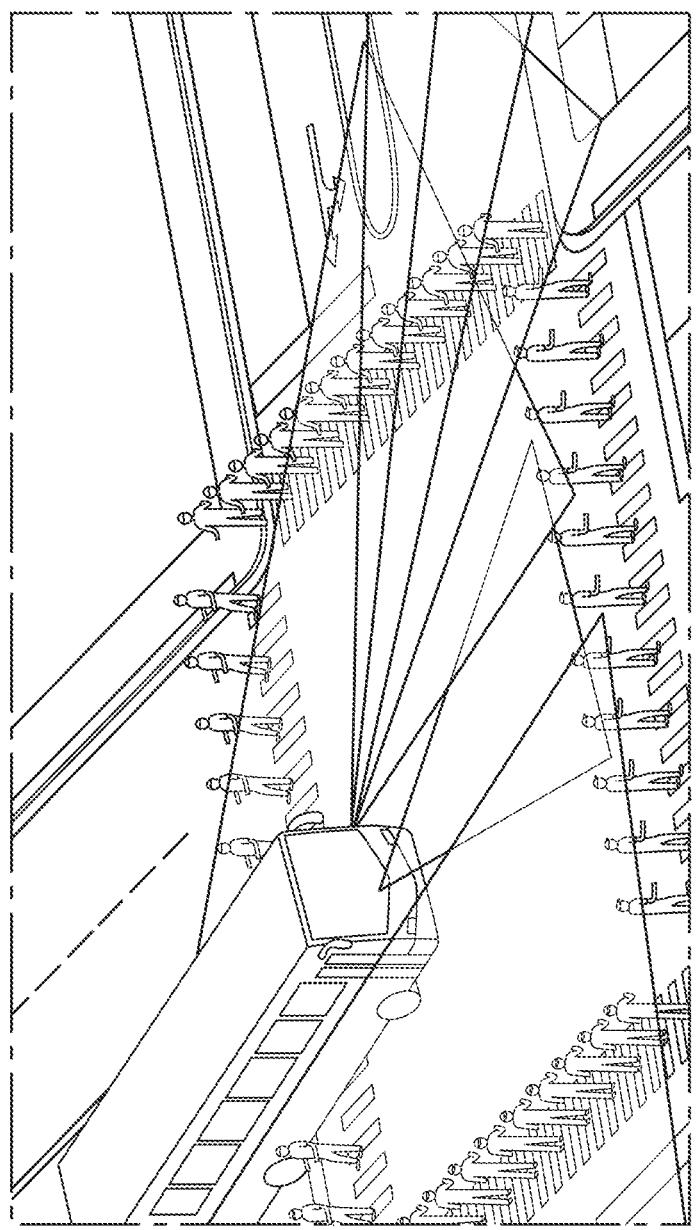
FIG. 12 is a perspective view of a vehicle with cameras/sensing devices and their fields of view in use during a left turn according to some embodiments.
Figure 13:
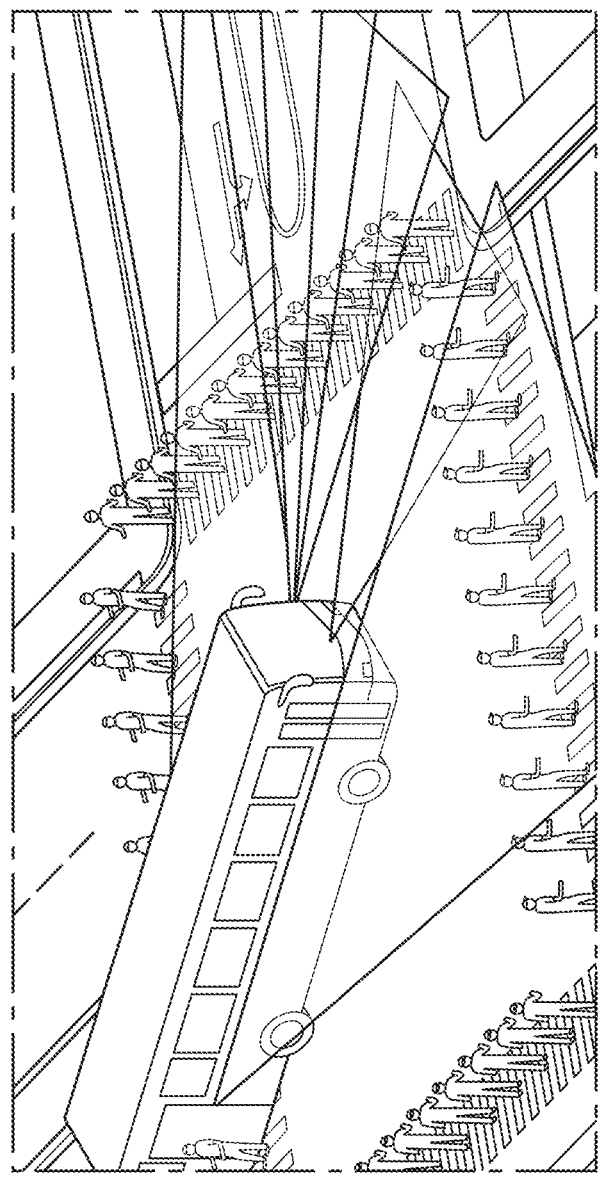
FIG. 13 is a perspective view schematic of a vehicle with cameras/sensing devices and their fields of view during a left turn according to some embodiments.
Figure 14:
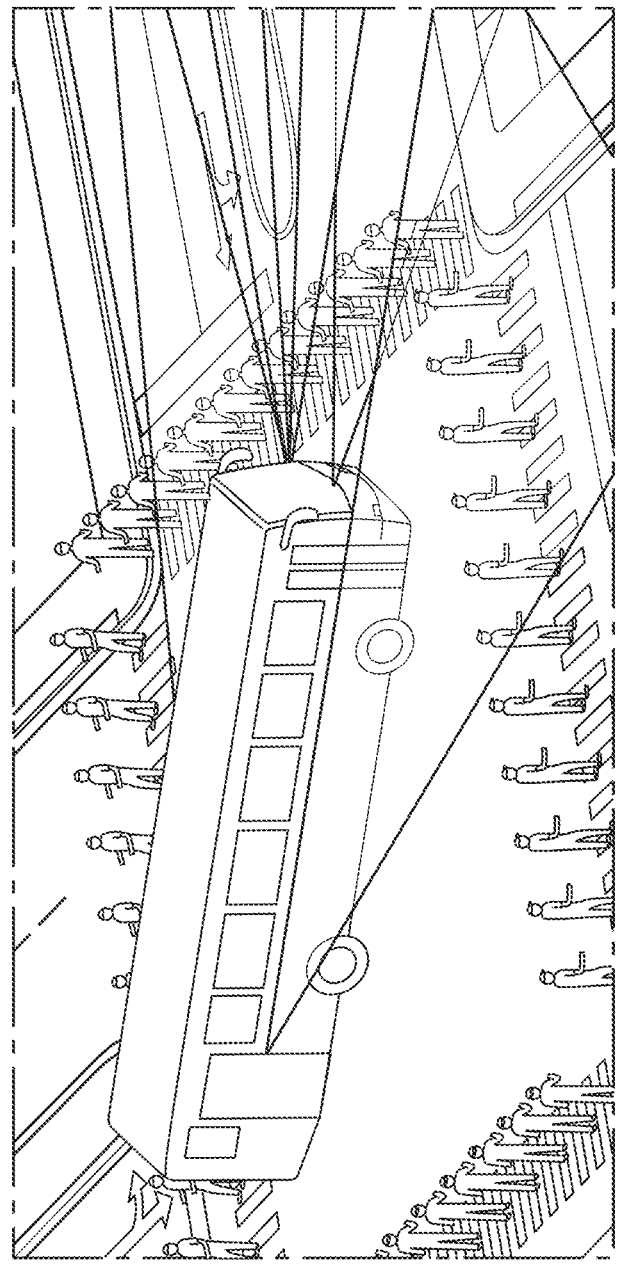
FIG. 14 is a perspective view of a vehicle with cameras/sensing devices and their fields of view in use during a left turn according to some embodiments.

Pedestrian hazards in particular arise when a bus travels through an intersection with pedestrians located at various places in the intersection, including the intersection crosswalks. An exemplary intersection is illustrated in FIGS. 10 and 11. An intersectional layout model includes pedestrians standing along the crosswalks. Each camera/sensor's field of view creates a cone of coverage, as illustrated in the figures referenced in the following discussion. In some embodiments, the camera/sensor's field of view may be configured or adjusted to be narrower when the vehicle is traveling in the forward direction, and wider when the vehicle is turning, optionally responsive to sensors that detect the vehicle's direction.

Figure 15:
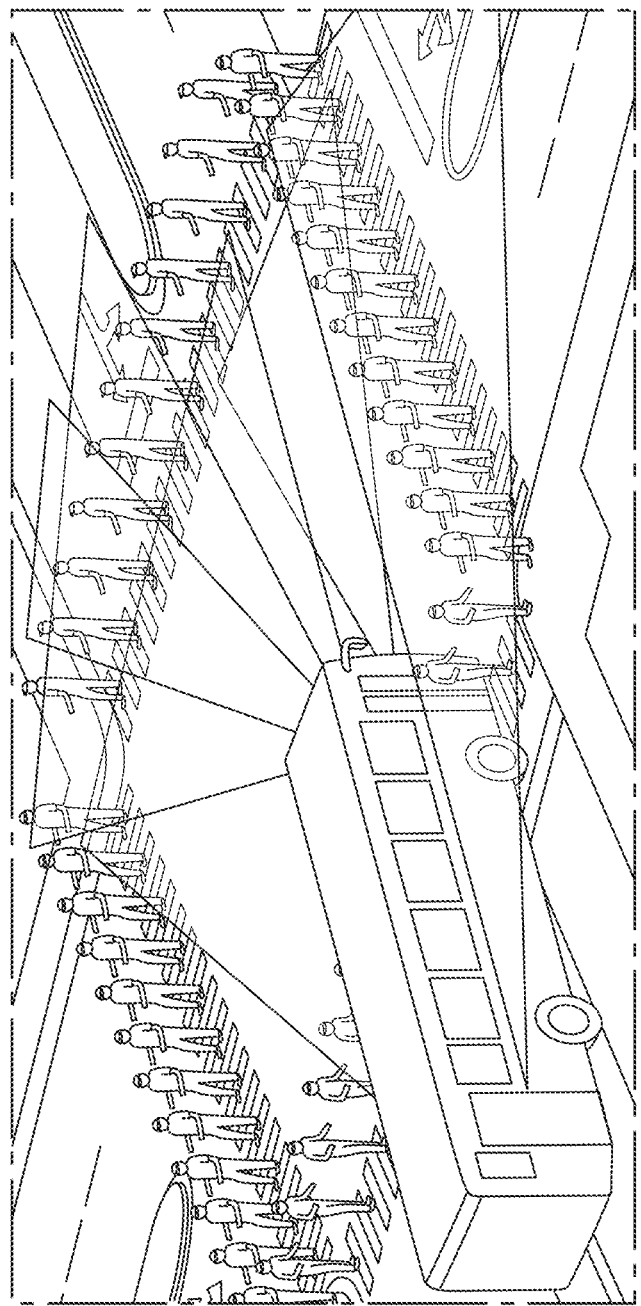
FIG. 15 is a perspective view of a vehicle with cameras/sensing devices and their fields of view in use during a right turn according to some embodiments.
Figure 16:
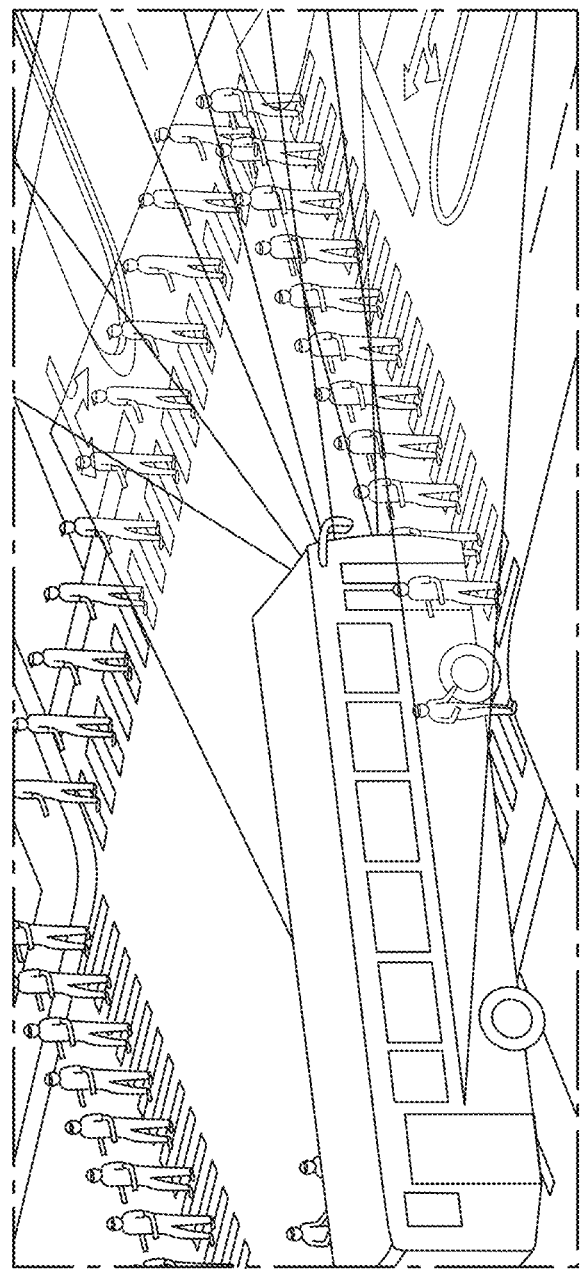
FIG. 16 is a perspective view of a vehicle with cameras/sensing devices and their fields of view in use during a right turn according to some embodiments.
Figure 17:
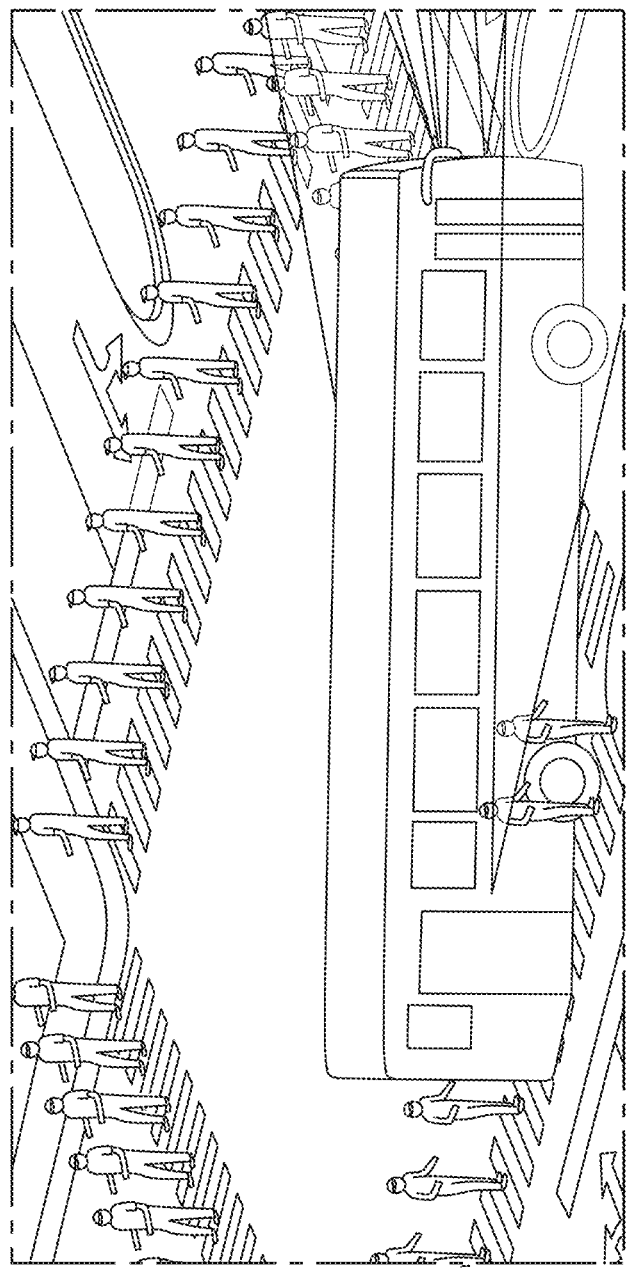
FIG. 17 is a perspective view of a vehicle with cameras/sensing devices and their fields of view in use during a right turn according to some embodiments.
Figure 18:
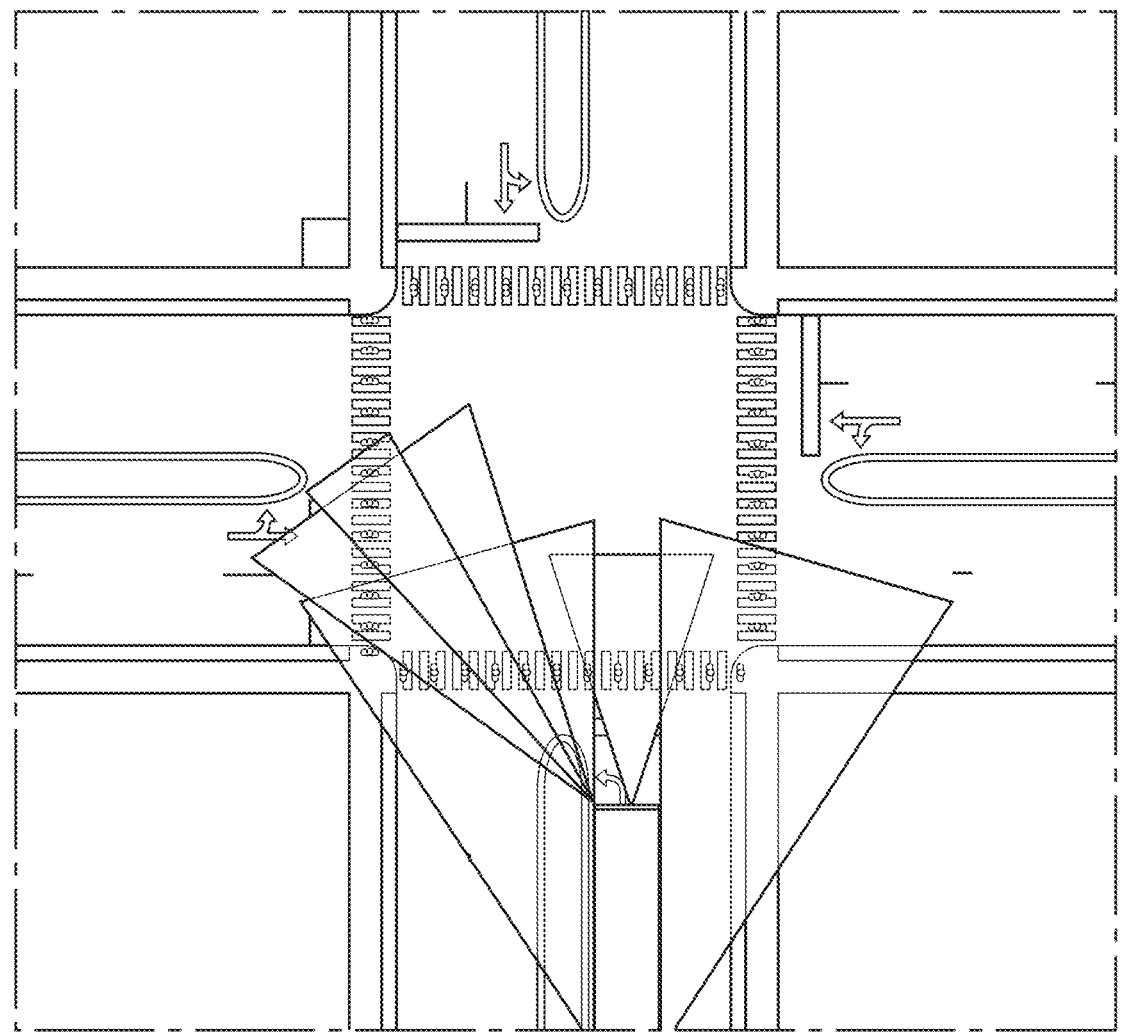
FIG. 18 is a top view of a vehicle with cameras/sensing devices and their fields of view in use according to some embodiments.

A pedestrian risk on the right side of the bus is illustrated in FIGS. 15-16, and arises when an unaware pedestrian, typically distracted by modern technology such as a phone, tablet or music device, enters a crosswalk alongside a bus in the midst of or beginning a right turn. The pedestrian, perhaps looking down at his device, keeps walking as the body of the bus "tracks" sideways during the turn and moves closer to the curb towards the pedestrian. The pedestrian may walk into the side of the bus, get knocked down and end up with his or her body or legs under the bus, risking getting rolled over by the rear wheels.

A pedestrian risk on the left side of the bus is illustrated in FIGS. 12-14 and 18, and presents similar tracking challenges as on the right side, but with the addition of a driver's forward blind spot that may hide a pedestrian who disembarks from the curb and walks in a direction opposite the travel of the bus. Specifically, the pedestrian continues in the crosswalk and as the bus penetrates the intersection and starts the left turn, the pedestrian remains in a blind spot as he moves and the bus turns. The corner area defined by the pillar and neighboring parts of the bus come into contact with the pedestrian. The pedestrian may not actually be in the blind zone, but may nonetheless be hit because the driver may be looking to his left after deciding to make the turn.

The presence of a pedestrian can be missed or ignored due to distractions. These distractions also include passenger interactions with the driver. The systems described herein can reduce the risk of accidents by increasing the driver's situational awareness, including by alerting the driver of nearby pedestrians and potential collision courses, and/or by increasing the pedestrian's situational awareness, including by alerting the pedestrian of the nearby vehicle.

In some embodiments, the plurality of cameras/sensors includes one or more forward-view cameras/sensors positioned on the front of the vehicle. A forward-view camera/sensor may provide a field of view centered along the forward facing longitudinal axis of the vehicle, and may detect a potential hazard and/or collision in the forward direction of travel. The forward-view camera/sensor may be an interior camera/sensor or an exterior camera/sensor. The forward-view camera/sensor is preferably positioned to provide a field of view that includes any hazards or pedestrians, including children, pets, or other small objects, immediately in front of the vehicle. Any or all of the cameras/sensors may be positioned with a vertical angular orientation and directed toward the desired target area. Various camera/sensor orientations, locations and/or angles may be used.

In some embodiments, each camera/sensor may provide a panoramic lens that provides a 120-degree view. Alternately, the field of view of a particular zone may result from a composition of multiple cameras/sensors. In order to provide a margin of error or to expand the field of view of a camera/sensor or cameras/sensors with limited fields of view, the fields of view of multiple cameras/sensors may be overlapped. Each camera/sensor may provide a 90° view or smaller, such as 25°-50°, and thus provide a reduced distortion in its field of view. Also, it will be understood that two or more cameras/sensors may be mounted in place of each of the cameras/sensors described, such that each of the cameras/sensors is positioned at a slightly different angle to increase the field of view of the combined cameras/sensors. The individual camera/sensor signals analyzed by the system may then be digitally combined in a seamless fashion to provide a combined camera/sensor signal. Thus, some embodiments may include one or more combination signals that are stitched together from signals from multiple camera/sensors.

Figure 7:
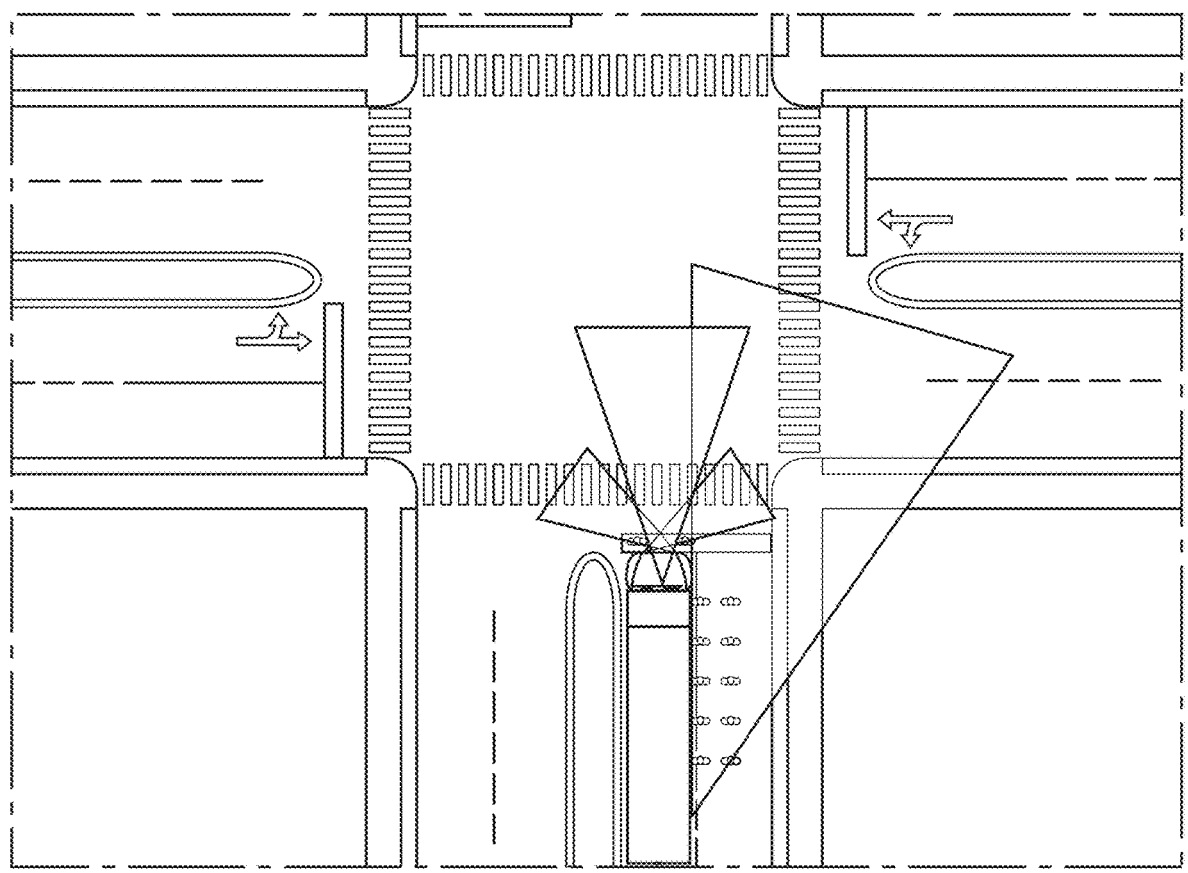
FIG. 7 is a top view of a vehicle with cameras/sensing devices and their fields of view in use according to some embodiments.
Figure 8:
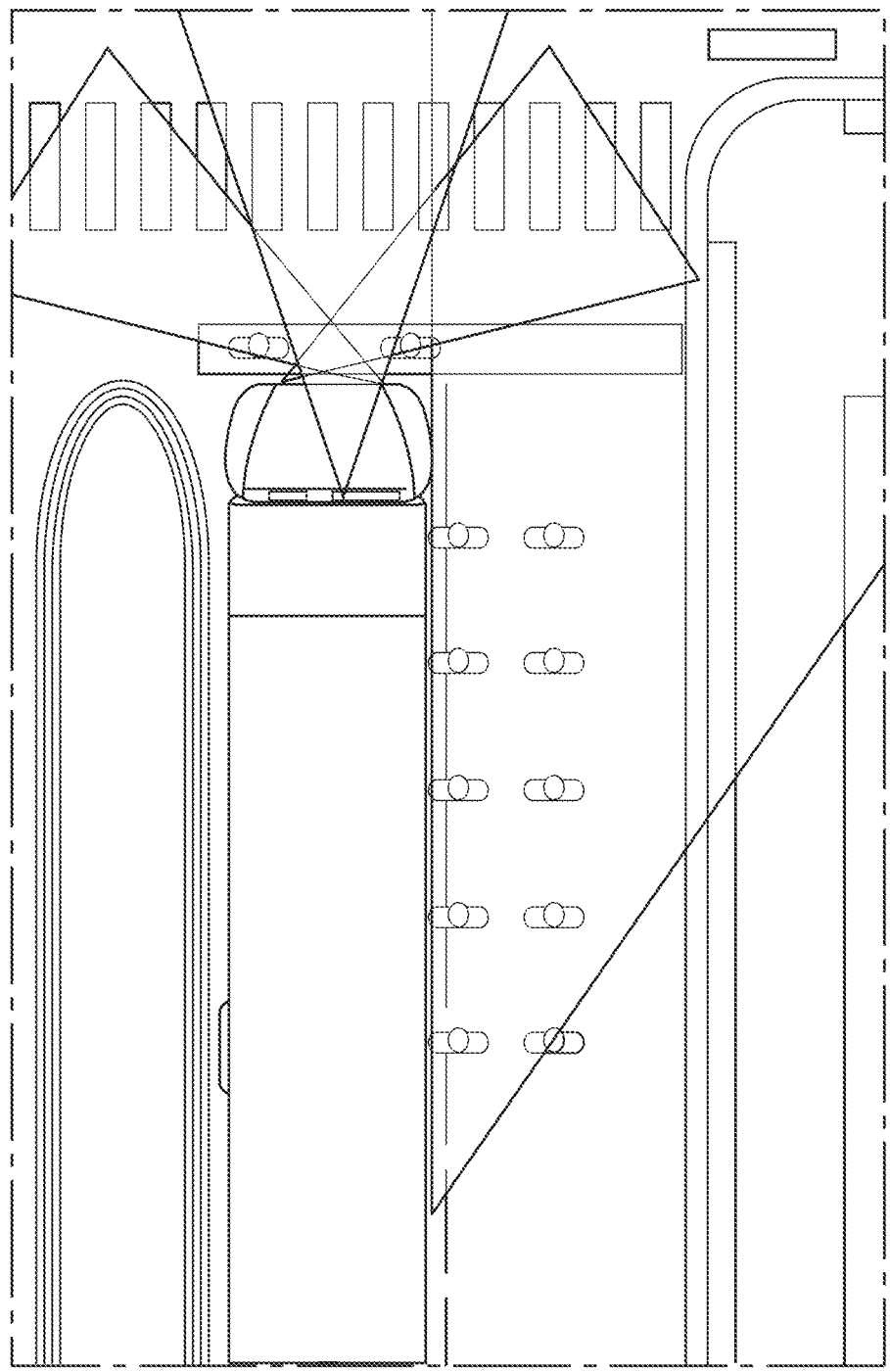
FIG. 8 is a top view of a vehicle with cameras/sensing devices and their fields of view in use according to some embodiments.
Figure 9:
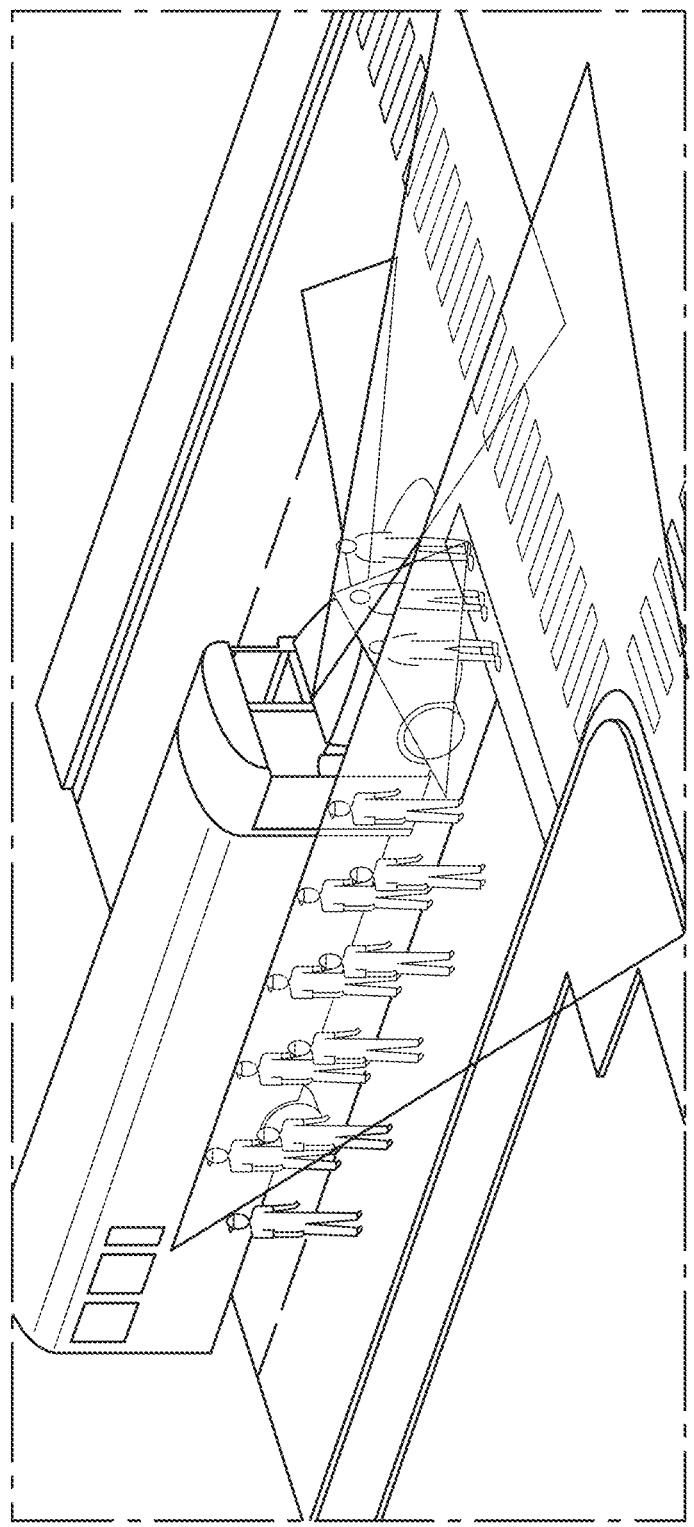
FIG. 9 is a perspective view of a vehicle with cameras/sensing devices and their fields of view in use according to some embodiments.

For example, where each camera/sensor's field of view is between 25°-50°, such as 38° or 40°, three cameras/sensors may be used. For example, the forward view may consist of three forward-view cameras/sensors: a center camera/sensor facing forward and two side-facing front cameras/sensors placed at either side of the front of the bus, such as on the windshield. The side-facing front cameras/sensors may be oriented with an angular tilt towards the front corners opposite to the corner that each side-facing front camera/sensor is mounted, in order to focus on a pedestrian disembarking in the crosswalk at the opposite side of the intersection as the bus starts a left or right turn. The front view cameras/sensors may have fields of view that correspond to those illustrated in FIGS. 7-8.

The center camera/sensor may be configured with detector system functions such as lane departure warning, headway monitoring, collision avoidance and/or sign reading. The center camera/sensor may also be configured for pedestrian detection. The side-facing front cameras/sensors may optionally have the basic functions turned off, so they are only active for pedestrian detection. The cameras/sensors may be programmed specifically for a predetermined range of coverage specific for turning situations, as discussed further below.

In some embodiments, the plurality of detectors/cameras/sensors includes one or more detectors/cameras/sensors that are oriented to detect hazards on the same side of the bus. For example, a detector/camera/sensor may be mounted on the front left portion of the bus and oriented towards an oncoming crosswalk during a left turn, for example, pointing at a 45 degree angle towards the oncoming crosswalk. Additionally and/or alternatively, a detector/camera/sensor may be mounted on the front right portion of the bus and oriented towards an oncoming crosswalk during a right turn, for example, pointing at a 45 degree angle towards the oncoming crosswalk. The plurality of cameras/sensors may additionally include cameras/sensors near the rear wheel on either or both sides of the bus. These rear-side cameras/sensors can cover the "tracking" activities of the bus during the turns described above. The rear-side cameras/sensors are oriented toward the front of the bus with the inner edge of their respective fields of view running along the side of the bus, and provide fields of view that include the area immediately to the side of the bus. A right rear-side camera/sensor may be positioned just forward of the rear of the vehicle on the right side of the vehicle and may be oriented to provide a field of view along the right side of the vehicle. On the left side of the vehicle, possibly aligned approximately at the same distance from the rear of the vehicle as the right rear-side camera/sensor, is a left rear-side camera/sensor. The left rear-side camera/sensor may be positioned to provide a field of view along the left side of the vehicle. The rear-side cameras/sensors may have fields of view that correspond to those illustrated in FIGS. 7-9 and 11-18. For simplicity's sake, not all camera/sensor fields of view are illustrated in each of these figures. The system and/or method may be configured to issue a warning when one or more of the front-side and/or rear-side mounted detectors/cameras/sensors detects a hazard. In some embodiments, the system and/or method may be configured to issue a warning only when both the left front-side and left rear-side mounted detectors/cameras/sensors or both the right front-side and right rear-side mounted detectors/cameras/sensors detect the same hazard and/or detect multiple hazards in the same and/or adjacent danger zones.

In some embodiments, the cameras/sensors are fixedly attached to the vehicle so that they provide a fixed field of view in their respective positions. Thus, the driver is always afforded a view that includes each of the danger zones around the bus, ensuring the safety of passengers boarding or disembarking from the bus or of pedestrians surrounding the bus. For example, children disembarking from the bus are at risk of falling under the bus, so it may be desirable to maintain a fixed field of view for one or more cameras/sensors.

In some embodiments, one or more cameras/sensors may be secured to the bus in such a way that driver is able to control their fields of view by moving the cameras/sensors left and right and/or up and down. Similarly, the cameras/sensors may be configured to allow zooming in or out to provide the driver with a close-up view or a greater depth of field. Such camera/sensor control may be provided by monitor controls, including a reset button to allow the driver to reset each of the cameras/sensors to a default position. In this way, pre-set danger zones around the vehicle can be easily viewed with the press of a button.

It will be understood that the specified fields of view of the respective cameras/sensors are described for the purposes of illustration and are not intended to be comprehensive of all contemplated fields of view. Many other configurations of fields of view are possible without departing from the spirit of the present invention.

Figure 19:
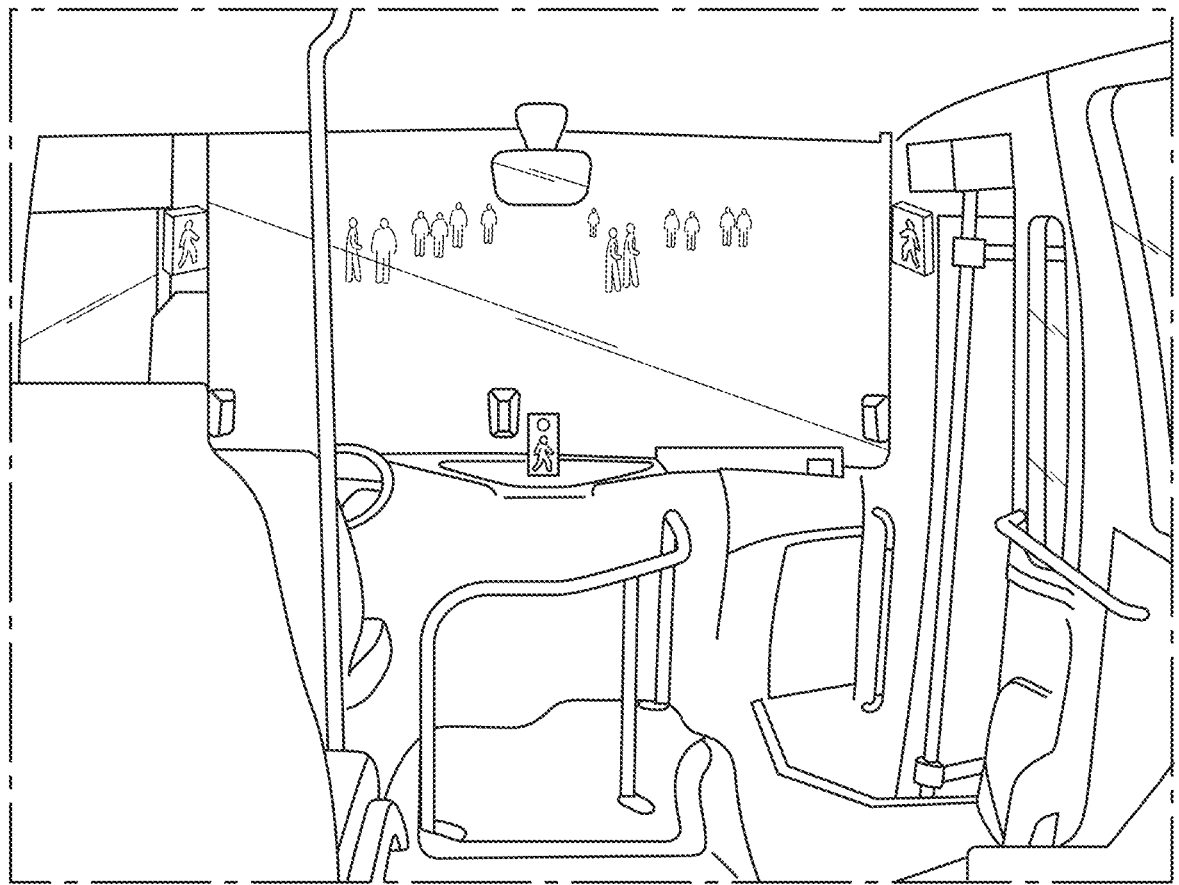
FIG. 19 is a perspective view of a driver interface according to some embodiments.

The forward-view cameras/sensors may be placed on the interior of the bus just below the roof, or behind the windshield inside the driver's cabin as shown in the cockpit layout illustrated in FIG. 19. Alternately, the forward-view cameras/sensors may be placed external to the vehicle, on the windshield or on the roof of the driver's cabin near the center of the vehicle. Each of the forward-view cameras/sensors may be positioned on the top of the roof of the bus, inside the bus, or alternatively, may be provided partially inside the vehicle with the lens portions of the side facing front cameras/sensors positioned just outside of the bus. Positioning the lens portion outside of the bus can avoid glare is generated by the window of the bus. On the other hand, providing the camera/sensor entirely inside the vehicle will tend to keep the lens freer of precipitation, dust and urban smog, and will tend to keep the camera/sensor safer from theft, vandalism or the like. Similarly, the forward-view cameras/sensors may be positioned partially inside the vehicle with the lens portions protruding outside of the bus, outside of the windshield, outside of the grill of the hood or otherwise. In addition, the forward-view cameras/sensors may be positioned underneath the body of the bus since their primary aim may be to view small objects or pedestrians located near the vehicle.

The rear-side cameras/sensors may be mounted on the exterior of the bus or located on the interior such as in one of the windows. The left rear-side camera/sensor may be identical or different from the right rear-side camera/sensor in the way it is mounted to or integrally formed with the wall of the bus. Similarly, any other cameras/sensors may be identical to or different from either or both of the rear-side cameras/sensors in structure and in the way they are mounted to or formed integrally with the external wall of the bus.

The cameras/sensors may be provided such that they are substantially inside the vehicle to prevent theft or vandalism. Alternately, any or all of the cameras/sensors may be mounted by camera/sensor arms to the exterior of the vehicle. For example, the side-facing front cameras/sensors may be mounted on arm assemblies which are typically provided for cross-view mirrors and which are often located at a position forward and to the side of the actual silhouette or outline of the vehicle.

Furthermore, any or all of the cameras/sensors may be provided as breakaway cameras/sensors such that if they undergo excessive impact the vehicle will not be damaged because the camera/sensor and/or the camera/sensor mount breaks off because of the impact. For example, any or all of the various cameras/sensors may be mounted on an arm assembly such that if the camera/sensor hits an obstacle, it swings sideways (backwards with respect to the motion of the bus) to protect the camera/sensor from becoming damaged and may automatically rebound or swing back to its original position. In some embodiments, the base on which the camera/sensor is mounted may swing and rebound as the result of an impact with an object. The cameras/sensors on the side may swing back and forth with respect to the movement of the vehicle and they may be provided with a gooseneck mount to facilitate the swinging and rebounding. The present assignee has described swinging and rebounding mirror mounts and breakaway and snap back mirror supports which can be utilized directly for mounting the cameras/sensors.

Further, each of the cameras/sensors may be surrounded to the extent possible by a protective tubular structure which is anchored to the arm assembly to allow the protective structure to absorb any blow or sudden force resulting from an object impact, thereby protecting the camera/sensor from damage. For example, the cameras/sensors may be encased in a heavy duty protective case, such as a plastic case, a PVC case or a metallic case, that absorbs impact or shock to the cameras/sensors impacts with from moving objects or from vandals. In some embodiments, any or all of the cameras/sensors are each separated into two or more distinct assemblies. For example, a first assembly or set of assemblies may include a lens and an imaging processor, and may be placed in a small housing on the vehicle exterior in various locations, while a second assembly including the control circuitry may be located in the vehicle interior, for example, on the wall opposite the sensors, camera and/or first assemblies, in a special enclosure connected, for example, by a long cable and/or wireless connection to the first assembly or set of assemblies, or other suitable location.

The audible alerts may be placed near the visual alerts (e.g., on the same readout as described above) or near the driver's head to present an increased directional awareness of the location of the danger. Outputs from the system may also include seat vibration or other forms of awareness such as seat headrest speakers and the like.

In some embodiments, the graphic driver interface may include two visible stages: an awareness stage and a warning. The visual alert may include a pedestrian graphic lit in yellow or amber to provide awareness of a pedestrian in range of a danger zone. The visual alert may then turn to red and the system may warn audibly if the system calculates that the pedestrian and bus are on a collision course. This calculation may be based on algorithms that determine a time to collision (TTC) based on the speed of the bus and trajectory of the pedestrian's movement, such that the system triggers an alarm if the calculated TTC falls within a preset threshold or other criteria indicating that a collision is possible or probable.

In some embodiments, the system and/or method avoids and/or minimizes false positives. A false positive is a detection warning when, for example, no risk is present and/or other predetermined conditions that are optionally user selectable are not met. The wider the area of coverage and sensitivity, the greater the sensing during normal driving that can lead to false positives. For example, driving straight with a side facing camera/sensing device engaged can lead to false positives when the cone of coverage is too wide. The system calculates a TTC based on trajectories that, given the increased speed of straight travel, become too inclusive and cognizant of pedestrians even 15-20 feet away alongside the bus where there is no risk of being hit.

False positives can be reduced or eliminated by, for example, turning off the side camera/sensing device outputs or reducing the sensitivity of the side cameras/sensing devices above a preset speed such as 12-15 mph. Additionally or alternately, the side cameras/sensing devices can have their outputs cut off or their sensitivity reduced except when the vehicle is detected to be in a turning activity. This detection can occur, for example, based on steering wheel turn sensing, gyroscopic sensing, actual wheel sensors tied to the vehicle Controller Area Network (CAN bus) system, multiplex system or other user selectable parameter. The system and/or method triggers the cut off of predetermined side cameras/sensing devices and/or front cameras/sensing devices, based on criteria such as the amount of a vehicle turn to ensure, for example, that the vehicle is committed to a turn which would represent a collision risk with the pedestrian before triggering the outputs or increasing the sensitivity of the side cameras/sensing devices. For example, a 10° turn to pull into a bus stop may be considered too little to engage the side cameras/sensing devices because the system should not be actively outputting at a bus stop where the risk of pedestrian collision is reduced for the side cameras/sensing devices when the vehicle is pulling into the bus stop. In contrast, once a turn exceeds a threshold such as 30° the system outputs are activated for the predetermined cameras/sensing devices. In some embodiments, the sensitivity of cameras/sensing devices that are not in the path of a turning bus may be decreased or the camera/sensing device outputs cut off while the bus is in the process of turning, for example, so alarms are not triggered by pedestrians, birds or other hazards that are not in likely to be in the path of the bus. In some embodiments, the system and/or method remains active and the side cameras/sensing devices continue to collect and store data, but the processors ignore the data collection for the determination of a potential collision when the side cameras/sensing devices are cut off. That is, in some embodiments, the data from the side cameras/sensing devices are merely ignored for a predetermined time period determined by when the potential for false positives is unacceptably high as programmed by the user or preset by the system/method.

In some embodiments, the camera/sensing device outputs and/or increased camera/sensing device sensitivity may be responsive to, or a function of, the speed or acceleration of the bus such that if the bus is turning faster and/or accelerating into a turn, the camera/sensing device sensitivity is increased, for example, in order to increase the response rate to compensate for the decreased time to a potential collision that results from the faster bus speed. Similarly, the camera/sensing device sensitivity may be decreased in response to a decreasing bus speed or acceleration while a turn is detected. Additionally and/or alternately, the camera/sensing device sensitivity may be responsive to, or a function of, a changing turning angle, such as a first or higher order derivative of the turning angle with respect to time. For example, the camera/sensing device sensitivity may increase in response to the detection of a sharp, accelerating turn, and vice versa.

In some embodiments, the system and/or method may include an infrared (IR) illumination system to provide for night vision. One or more infrared illumination devices may be provided below or on top of each camera/sensing device or within the camera/sensing device, or a pair of such devices may be provided on either side of each camera/sensing device, to provide a field of view around the vehicle in levels of light approaching total darkness. The IR illumination system may be provided as an LED lighting strip, an incandescent light source or as some other type of illumination.

Additionally or alternatively, an automatic target recognition (ATR) may be provided with one or more of the cameras/sensing devices. FLIR (Forward-Looking Infrared) systems, LIDAR (Light Detection And Ranging)/LADAR (Laser Detection And Ranging), infrared laser (light amplification by stimulated emission of radiation) or radar sensors are well known for sensing and tracking people or stationary or moving objects. Such ATR systems may be programmed to be particularly sensitive to detect and track images of people or children or other passersby in close proximity to the bus, for example.

Thus, such ATR systems, when used in combination with pedestrian detection systems and methods according to the present invention may be particularly useful to avoid accidents involving passersby moving around the vehicle. Such an ATR system may be deployed next to, for example above or below, each camera/sensing device and may be programmed to provide an audio input, or a flashing light or the like when an object is detected. Also, the ATR may track the moving object and a silhouette or outline of the moving object may be highlighted on a monitor provided in the driver's area. Any or all of the cameras/sensing devices could be moved automatically, or under the control of the driver, to follow the detected and tracked moving object near the bus.

In some embodiments, a pedestrian and driver alert and/or collision avoidance system is provided that includes a sensing device configured to sense an exterior hazard in first, second and third states of potential collision in a first field of view responsive predetermined criteria, for example, indicative of a potential collision. In addition, the system includes a driver warning system configured to generate a driver visual warning or audible alarm to alert the driver when the exterior hazard is detected in the first state of potential collision, and generating another driver visual warning or audible alarm configured to alert the driver when the exterior hazard is detected in the second state of potential collision. The system also includes a pedestrian warning system configured to generate a pedestrian visual warning or audible alarm to alert the pedestrian when the exterior hazard is detected in the first state of potential collision, and generating another pedestrian visual warning or audible alarm configured to alert the pedestrian when the exterior hazard is detected in the third state of potential collision.

In some embodiments, at least one of the first, second or third states is determined when: (1) the speed of the vehicle is within a first predetermined speed range or over a first predetermined speed, (2) the vehicle initiates a turn or a yaw rate and/or turn rate of the vehicle is within a first predetermined rate range or over a first predetermined rate, and (3) a pedestrian is within a first predetermined distance to the vehicle. In some embodiments, the first state is responsive to at least a first estimated time to the potential collision, wherein the second state is responsive to at least a second estimated time to the potential collision, and wherein the third state is responsive to at least a third estimated time to the potential collision. In some embodiments, the first state is responsive to at least a first estimated time to the potential collision comprising an imminent collision, the second state is responsive to at least a second estimated time to the potential collision comprising a potential collision, and the third state is responsive to at least a third estimated time to the potential collision comprising a pedestrian warning of potential collision that is advantageously and optionally not provided to the driver to minimize unnecessary driver alerts that might distract the driver.

In some embodiments, the driver warning system is further configured to not generate at least one of a third driver visual warning or a third driver audible alarm when the exterior hazard is detected by the at least one sensing device in the third state of potential collision. In some embodiments, the pedestrian warning system is further configured to generate the at least one of the first pedestrian visual warning or the first pedestrian audible alarm to alert the pedestrian when the exterior hazard is detected by the at least one sensing device in the second state of potential collision. In some embodiments, the first state of potential collision indicates an imminent threat of collision, the second state of potential collision indicates a caution situation of impending collision, and the third state of potential collision indicates a potential collision to warn the pedestrian of the presence of the vehicle. In some embodiments, the sensing device comprises a plurality of sensing devices mounted on plurality of first locations around the vehicle to detect the presence of a pedestrian in all areas around the vehicle, and the pedestrian warning system comprises a plurality of pedestrian warning systems around the vehicle to generate a pedestrian visual warning or a pedestrian audible alarm to alert the pedestrian. In some embodiments, the pedestrian is provided the visual warning or the audible alarm from at least one of the plurality of pedestrian warning systems responsive to predetermined criteria including distance between the pedestrian and the pedestrian warning system. In some embodiments, the pedestrian is provided the warning by the pedestrian warning system that is on the same side of the vehicle to advantageously minimize unnecessary warnings or unnecessary noise that will not reach the pedestrian.

The camera/sensing device control may optionally also include signal processing which detects pedestrians moving about the bus and which displays the moving pedestrians in a sharp color on a monitor, for example, red against a background of black, white or grey to allow the driver to keep a sharp eye and maintain sight of nearby pedestrians, for example, while passengers board or disembark the bus. Thereby, the system might be utilized for zooming in or adjusting the precise aim of the cameras/sensing devices while the bus is stationary to monitor a pedestrian or several pedestrians moving in front or alongside the bus by providing images and/or videos in a size that will effectively make their presence known to the driver. The signal processing system may provide an audible alert to the driver such as a buzzing sound as long as the system detects objects that are moving near and about the bus while the bus is parked in order to take on or discharge passengers. In some embodiments, the cameras/sensors may comprise a standard system/sensor system incorporated herein by reference and which offer features such as Forward Collision Warning, Lane Departure Warning, Headway Alert, Pedestrian Detection, Enhanced Object Detection, Automatic Headlight Control, Traffic Sign Recognition, Adaptive Cruise Control, Pre-Crash Collision Mitigation, Autonomous Braking, Blind Spot Detection, Lane Change Merge Assist, Rear Cross Traffic Alert, and/or Rear Pre-Crash Sensing which offer features such as Forward Collision Warning, Pedestrian and Cyclist Collision Warning, Headway Monitoring Warning, Lane Departure Warning, Intelligent High-Beam Control, Speed Limit Indicator, and/or Traffic Sign Recognition.

Also contemplated is a physical sun visor and sun shield provided over each of the cameras/sensors to block a significant portion of sun incident on the camera/sensor lens. Each camera/sensor lens may be covered with a light filter to screen out light or other harsh or bright radiation. In addition, electronic controls may be provided to filter out excessive sunshine or bright lights.

In some embodiments, one or more monitors are included in the driver's cabin. The monitors may be any type of monitors suitable for displaying a video or signal feed in real time, such as CRT displays, LCDs, LEDs, front or rear projection devices, flat panel devices, or the like. There may be a monitor corresponding to each camera/sensor. Alternately, multiple cameras/sensors may map to an individual monitor. For example, a monitor may be programmed to provide a split display showing multiple views provided by multiple cameras/sensors simultaneously. In some embodiments, the system may provide the driver the option of selecting which camera/sensor's image to display on a single monitor. Thus, the driver may switch between the fields of view of the various cameras/sensors by operating a control provided as part of the monitor. Alternatively, a central control may be provided on the dashboard or an otherwise accessible location to allow the driver to select between the various cameras/sensors.

The monitors may be one or more individual units located above the dashboard, or alternately, may be positioned on top of the dashboard, embedded in or formed integrally with the dashboard. The one or more monitors may be individual units, or may be configured as one large monitor providing a display corresponding to all or some of the cameras/sensors such that various portions of the unified monitor would be permanently dedicated to displaying one or more particular fields of view.

According to a further embodiment, the view displayed in the monitor may be automatically switched according to the operation of the bus. For example, when the bus turns left or right, the display of monitor may show the field of view corresponding to the left or right rear-side camera/sensor, respectively. Initially when the vehicle is shifted to the "drive" gear, the outputs of the rear-side cameras/sensors may be immediately shown on a monitor. Alternately, initially and for a period of about 7 to 15 seconds, or thereabout, the output of a forward looking camera/sensor continues to be displayed on a monitor, and thereafter, the output of the left and/or right rear-side camera/sensor begins to be displayed so that as the driver embarks on a trip to a given destination, the displays show the view to the side of the bus to improve the driver's ability to monitor traffic in adjacent lanes. Alternately, a controllable programmer may be provided to allow the driver to select when the different camera/sensor outputs are shown on the monitors, such as in response to the switching of the transmission from "drive" to "reverse" and vice versa. In another embodiment, the forward speed of the bus determines the camera/sensor output displayed on the monitor. For example, the output of a rear-side camera/sensor may be switched to the monitor once the bus has reached a given speed, for example, 10 miles an hour.

Also, the display on a monitor may be controlled based on the engaged gear. For example, after the bus is switched into the drive gear, or first gear, from park or reverse, the output of a forward view camera/sensor may be shown on a monitor. When the bus is shifted into the parking gear, or to first gear from a higher gear, the display in a monitor may be switched to the output of the left and/or right rear-side camera/sensor. These switching modes are provided as examples, and the sequence of displays provided may be programmed according to the convenience of the driver, or according to the wishes of the bus operator company.

Also contemplated is a night view mode for the monitor (s). In night view mode, the brightness of a monitor would be automatically dimmed or subject to driver control so as to prevent driver eye strain. The monitor could be dimmed gradually based on an automatic detection of the level of darkness.

The system may also include a digital video recorder (DVR), including memory, which receives signals from some or all or of the cameras with video capture capability. These DVRs may record the camera signals while the bus is in motion and/or while there is any activity in and around the bus. The recording can occur, for example, in response to detection of an approaching pedestrian or other hazard, in response to a dashboard pushbutton and/or when the bus is left unattended so as to prevent vandalism and theft.

In some embodiments, the system also includes an interior cabin camera, which provides the driver with a view of the inside of the vehicle. The interior cabin camera may be positioned just above the windshield in the driver's cabin or may be positioned posterior to the driver's cabin inside the vehicle. Particularly for a bus or other large vehicle application, the interior cabin camera affords the driver a view of what is happening inside the vehicle behind the driver in real time. Video from the interior cabin camera may be displayed on a monitor.

In some embodiments, the system also includes one or more video cameras installed in addition to the cameras/sensors described above. For example, where the camera/sensor systems used for pedestrian detection do not have video capture functionality, one or more additional video cameras may be installed near each camera/sensor, for example, immediately above or below each camera/sensor. The captured video can be used, for example, for testing, verification and/or training, sent to a driver or fleet-manager monitor, stored via a DVR, and/or otherwise. For example, the captured video can be compared to the data detected by the camera/sensor to confirm that a detected pedestrian is sufficiently close to warrant an alarm. Similarly, the captured video can be used to confirm that the detection system was correct in not issuing an alarm and/or incorrect in issuing an alarm. Accordingly, this comparison can be used, for example, to tune the sensitivity of the detection system, train a driver by allowing the driver to review events and experience the alarm conditions and/or allow for monitoring by a fleet manager, optionally in real-time for driver performance. In some embodiments, a standard bullet camera is used that has a mount attached to that screws into the housing, and therefore, no additional mounting to the bus is required. A cable runs to the camera from the housing. The camera can be a standard CMOS camera and/or standard bullet camera. In some embodiments, the camera is connected to the bottom plate of the housing. Alternatively, the camera can be connected to any plate of the housing that allows the camera to provide an additional view that tracks the detector/camera used within the housing. According to this alternative embodiment, the invention advantageously uses cameras and/or detection devices to ascertain accuracy of collision avoidance for the cameras and/or detectors within the housing that will be used in real-life/live situations. In some embodiments, multiple video cameras may be mounted at various locations around the vehicle to create a video environment. For example, two video cameras may be mounted at the rear of the vehicle, one on the left side of the vehicle and one on the right, and two video cameras may be mounted at the front of the vehicle facing rearward, one on the left side of the vehicle and one on the right, all of which can be oriented to capture video of the desired target areas. Optionally, a fifth camera may be mounted inside the cabin behind the driver, for example four feet behind the driver, and oriented to capture the driver and the graphic driver interface including the pedestrian readouts. These video feeds can be used, for example, during test runs where a driver's reactions to various events, with and without alarms, are recorded and subsequently reviewed, for example, to test how the driver reacts to the presence or absence of various alarms, for driver training, or otherwise. In some embodiments, the video feeds are, for example, displayed to the driver during operation, stored for later review, for example, to determine what happened during an accident, used for real-time fleet manager review, and the like.

In some embodiments, one or more dual-vision cameras (e.g., a dual view video camera) may be provided inside the vehicle, for example, on the windshield. Dual-vision cameras can provide views inside and outside of the vehicle. For example, a first built-in camera can capture footage from a forward perspective, while a second can record the activity of drivers and passengers. Views from one or more dual-vision cameras can be compared with views from one or more outside cameras to track movement of pedestrians around the vehicle. In some embodiments, the pedestrian detection system may comprise, for example, one dual-vision windshield camera (e.g., Rosco DV231, a high-capacity audio/video digital recorder with a post-route GPS tracker included) mounted inside the windshield at or near the center of the vehicle, and two side cameras, left and right.

Figure 20:
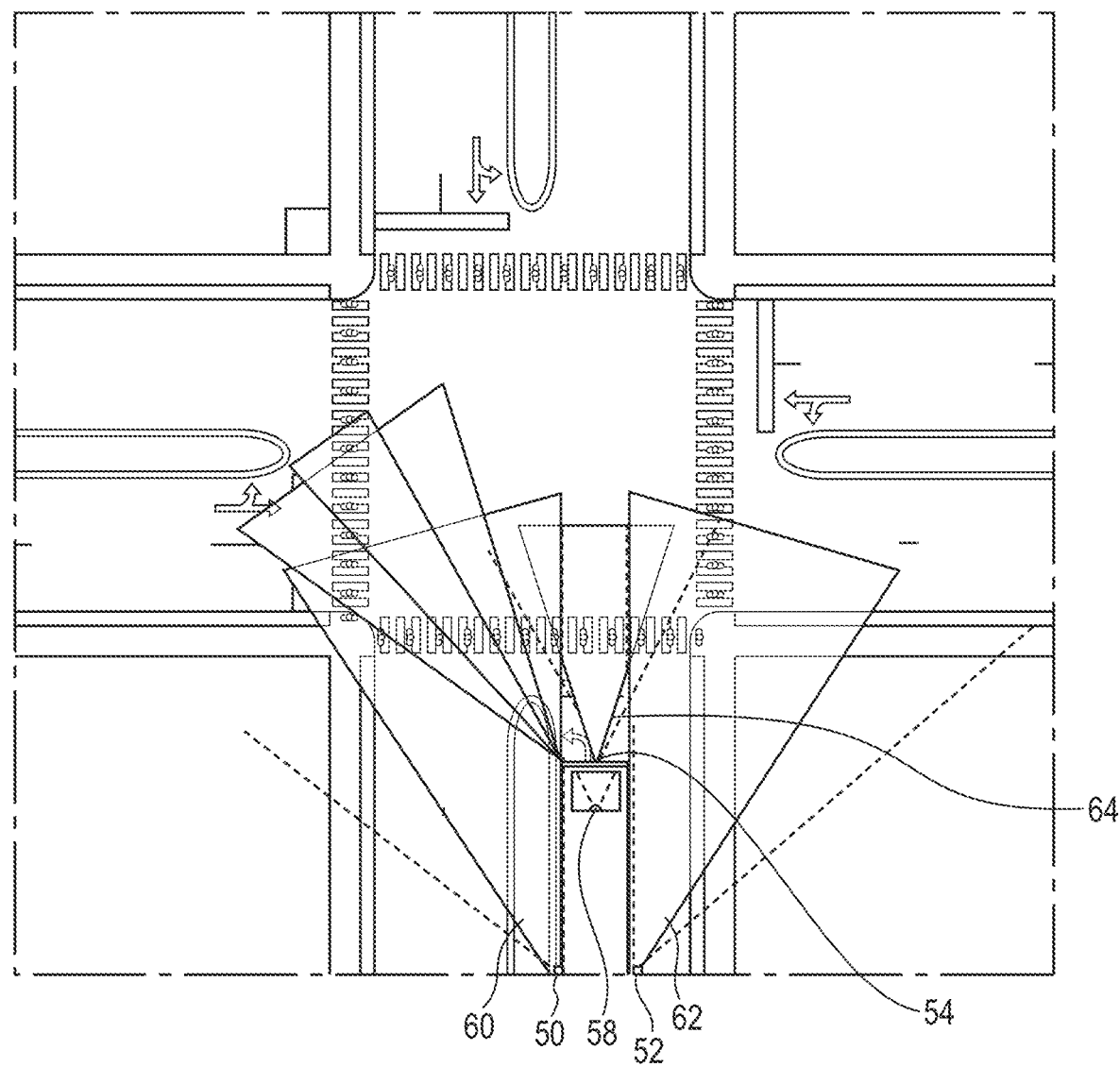
FIG. 20 is a top view of a vehicle with a pedestrian detection system including various cameras/sensing devices and video cameras, and their fields of view, according to some embodiments.

FIG. 20 illustrates an exemplary embodiment of a pedestrian detection system which includes video cameras as part of the pedestrian detection system, and their exemplary fields of view. For example, the pedestrian detection system may include cameras/sensors comprising detectors with or without video capture functionality that produce fields of view 60, 62, and 64. In addition, video cameras 50, 52 and 54 are advantageously mounted near each non-video detector and produce the corresponding dashed fields of view to capture video for storing, playback and/or analysis. The fields of view of the video cameras need not perfectly overlap the fields of view of each of the cameras/sensors, though preferably the video camera fields of view encompass those of each non-video detector and/or at least the areas near the vehicle that are considered dangerous and/or possible collision locations with the pedestrian. Optional interior video camera 58 (which may be a dual-vision camera as described above) captures the driver and the graphic driver interface that falls within the corresponding dashed field of view. In some embodiments, the captured video is transmitted and stored in a memory on board the vehicle and/or at a remote location, for example, as described in U.S. Pat. No. 8,520,070, incorporated herein by reference in its entirety, and utilized as described therein and/or as described herein.

Figure 21:
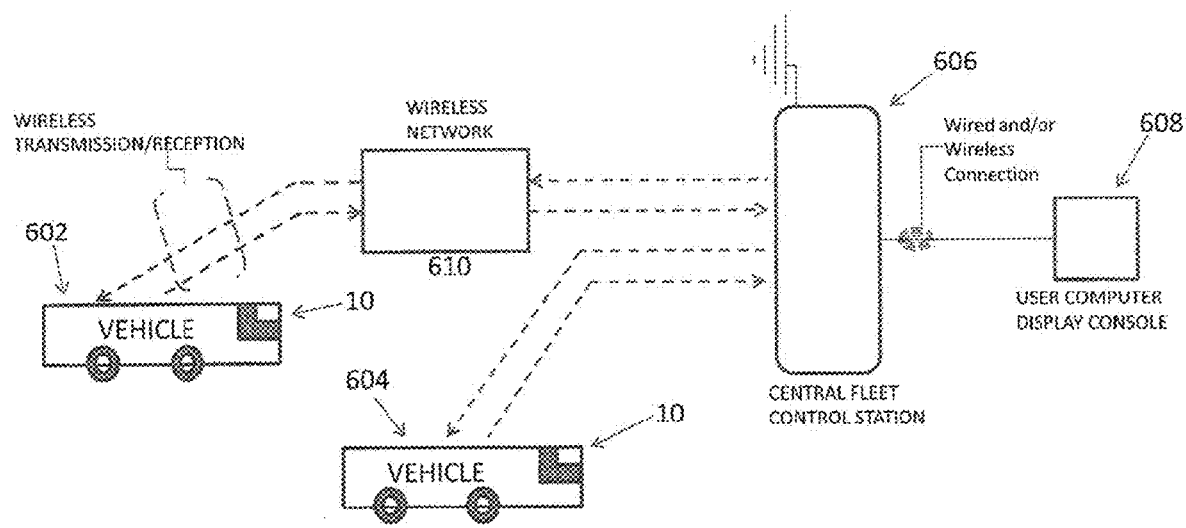
FIG. 21 is a schematic layout of a fleet control system according to some embodiments.

FIG. 21 illustrates a general schematic layout of a fleet tracking system in accordance with some embodiments. A vehicle, such as, for example, vehicles 602 or 604, moves along a transport route. The route may be one that is well known and traveled often, such as a bus route, or may be one that is being newly traveled by the vehicle, such as a taxi route. In some embodiments, each vehicle is equipped with a pedestrian detection system comprising at least one camera/sensor. As described above, in some embodiments as the vehicle travels along a transport route, or at specific locations, certain predefined events may trigger activation of an alarm and/or corrective action associated with the camera/sensor. Additionally or alternatively, the camera/sensor may be activated in accordance with a predefined schedule and/or may be activated manually by an operator in the vehicle and/or remotely by a remote user such as a fleet manager.

In some embodiments, a pedestrian detection system according to the present invention communicates wirelessly with the fleet management control system during transit and/or at defined times and/or locations. The fleet manager may access the fleet management control system at a central station, such as central fleet control station 606, or from any other suitable remote location, using any suitable device, such as user computer display console 608. User computer display console 608 may be a standard computer system or electronic computing device connected via a wired and/or wireless connection. Alternatively, user computer display console 608 may be any suitable mobile device, such as, for example, a mobile phone, smartphone, PDA, tablet, GPS system, laptop, or any other standard or specially configured computing device with wireless capabilities.

Activation of the camera/sensor may include capturing any combination of low and/or high resolution still images and/or low and/or high resolution video capture, in addition to vehicle related metadata. In some embodiments, as shown in FIG. 21, image and/or data transmission/reception may be conducted via any standard communications network, such as wireless network 610. For example, FIG. 21 shows image/data transmission/reception from vehicle 602 to central fleet control station 606 via wireless network 610. Additionally or alternatively, image/data transmission/reception may be conducted directly between a vehicle and a monitoring station, as shown between vehicle 604 and central fleet control station 606. Furthermore, image/data transmission/reception may also be conducted wirelessly directly between a vehicle and user console, such as between vehicles 602, 604, and user computer display console 608.

In some embodiments, image/data transmission/reception may be conducted directly between a vehicle and a storage device located at a vehicle parking garage via Wi-Fi, either manually or automatically, at the end of the route or the end of day. In some embodiments, the vehicle may interface directly with an on-board cellular device, such as a personal phone or other mobile-to-mobile, SIM-card enabled device, for immediate transmission to a server via Wi-Fi, Bluetooth, RF, or any other form of wireless communication.

In some embodiments, the application may include an application program interface, or alternatively, the application may be resident in the memory of the computing device or the server. In another embodiment, the only distribution to the computing device may be a graphical user interface ("GUI") which allows a user to interact with the application resident at, for example, the server.

In some embodiments, the application may encompass one or more Web-pages or Web-page portions (e.g., via any suitable encoding, such as HyperText Markup Language ("HTML"), Dynamic HyperText Markup Language ("DHTML"), Extensible Markup Language ("XML"), JavaServer Pages ("JSP"), Active Server Pages ("ASP"), Cold Fusion, or any other suitable approach).

Although the application is described herein as being implemented on a computing device and/or server, this is only illustrative. The application may be implemented on any suitable platform (e.g., a personal computer ("PC"), a mainframe computer, a dumb terminal, a data display, a two-way pager, a wireless terminal, a portable telephone, a portable computer, an automobile PC, a laptop computer, tablet, multimedia device, a cellular phone, a personal digital assistant ("PDA"), smartphone, etc., to provide such features.

It will also be understood that the detailed description herein may be presented in terms of program procedures executed on a computing device or network of computing devices. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

For the purposes of illustrating certain aspects of the present invention, the preferred embodiments are described above and illustrated in the drawings. It should be understood, however, that the application is not limited to the precise arrangement, structures, features, embodiments, aspects, and devices shown, and the arrangements, structures, features, embodiments, aspects and devices shown may be used singularly or in combination with other arrangements, structures, features, embodiments, aspects and devices. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including equivalent constructions to those described herein insofar as they do not depart from the spirit and scope of the present invention.

For example, the specific apparatus described above may be altered so that certain parts are independent or combinable with other parts, to the extent that the parts are not dependent upon each other. Thus, the specific parts described herein are not to be considered implying specific parts to implement the above described apparatus. Other alterations or modifications of the above apparatus are also contemplated. For example, further insubstantial changes and/or interchangeable parts of the above are also considered within the scope of the apparatus described herein.

In addition, features illustrated or described as part of one embodiment can be used on other embodiments to yield a still further embodiment. Additionally, certain features may be interchanged with similar devices or features not mentioned yet which perform the same or similar functions. Further, while a specific sequence of process steps has been described, the sequence and/or order of steps can be modified in any suitable manner to achieve the results of the present invention. It is therefore intended that such modifications and variations are included within the totality of the present invention.

The invention claimed is:

1. A pedestrian alert and/or collision avoidance system for a large vehicle, comprising:
a first sensing device configured to sense a speed of a vehicle when the vehicle is travelling in a first direction;
a second sensing device configured to sense at least one of: when the vehicle initiates a turn or when a turn rate of the vehicle is within a first predetermined rate range or exceeds a first predetermined rate;
a third sensing device configured to sense when a pedestrian is within a first predetermined distance to the vehicle; and
a pedestrian alarm system configured to issue a first auditory warning message via a first speaker mounted on at least a first side of the vehicle when at least one of: (1) the speed of the vehicle is within a first predetermined speed range or over a first predetermined speed, (2) the vehicle initiates the turn or the turn rate of the vehicle is within the first predetermined rate range or over the first predetermined rate, or (3) the pedestrian is within the first predetermined distance to the vehicle.

2. A pedestrian alert and/or collision avoidance system of claim 1, further comprising a driver warning system generating at least one of a driver visual warning or a driver audible alarm configured to alert the driver when an exterior hazard is detected.

3. A pedestrian alert and/or collision avoidance system of claim 1, wherein said pedestrian alarm system is configured to issue a second auditory warning message via at least one of the first speaker or other speaker responsive to at least one of: second vehicle speed, second vehicle initiating a turn, second vehicle turn rate, or second pedestrian distance to the vehicle.

4. A pedestrian alert and/or collision avoidance system of claim 3, wherein said pedestrian alarm system is configured to issue a third auditory warning message via at least one of the first speaker or other speaker responsive to at least one of: third vehicle speed, third vehicle initiating a turn, third vehicle turn rate, or third pedestrian distance to the vehicle.

5. A pedestrian alert and/or collision avoidance system of claim 4, wherein the first auditory warning message indicates an imminent threat of collision, the second auditory warning message indicates a caution situation of impending collision where the second pedestrian distance is greater than the first pedestrian distance, and the third auditory warning message indicates a potential collision where the third pedestrian distance is greater than the second pedestrian distance.

6. A pedestrian alert and/or collision avoidance system of claim 1, wherein a pre-configured time period is waited before the first auditory warning message is issued.

7. A pedestrian alert and/or collision avoidance system of claim 1, wherein a continuous sound or bursts of sound is emitted at one or more of: a configurable frequency, volume or pattern when in motion and within a distance threshold with a pedestrian.

8. A pedestrian and driver alert and/or collision avoidance system for a large vehicle, comprising:
at least one sensing device configured to sense an exterior hazard in first, second and third states of potential collision in a first field of view responsive to first predetermined criteria when a vehicle is travelling in a first direction, said first sensing device mounted on a first area of the vehicle;
at least one driver warning system configured to generate a first driver visual warning to alert the driver when the exterior hazard is detected by the at least one sensing device in a first state of potential collision, and generating a second driver visual warning configured to alert the driver when the exterior hazard is detected by the at least one sensing device in a second state of potential collision;
at least one pedestrian warning system configured to generate a first pedestrian visual warning to alert the pedestrian when the exterior hazard is detected by the at least one sensing device in the first state of potential collision, and generating a second pedestrian visual warning configured to alert the pedestrian when the exterior hazard is detected by the at least one sensing device in the second state of potential collision; and
at least one other sensing device configured to detect level of an environmental noise data on at least one side of the vehicle, wherein the environmental noise data are transmitted to the pedestrian warning system.

9. A pedestrian and driver alert and/or collision avoidance system according to claim 8, wherein at least one of the first, second or third states is determined when at least one of: (1) the speed of the vehicle is within a first predetermined speed range or over a first predetermined speed, (2) the vehicle initiates a turn or a turn rate of the vehicle is within a first predetermined rate range or over a first predetermined rate, or (3) a pedestrian is within a first predetermined distance to the vehicle.

10. A pedestrian and driver alert and/or collision avoidance system according to claim 8, wherein the first state is responsive to at least a first estimated time to the potential collision, and wherein the second state is responsive to at least a second estimated time to the potential collision.

11. A pedestrian and driver alert and/or collision avoidance system according to claim 8, wherein the first state is responsive to at least a first estimated time to the potential collision comprising an imminent collision, and wherein the second state is responsive to at least a second estimated time to the potential collision comprising a potential collision.

12. A pedestrian and driver alert and/or collision avoidance system according to claim 8, wherein the first state is responsive to at least a first estimated time to the potential collision comprising an imminent collision, and wherein the second state is responsive to at least a second estimated time to the potential collision comprising a potential collision.

13. A pedestrian alert and/or collision avoidance system according to claim 8, wherein the first state of potential collision indicates an imminent threat of collision, and the second state of potential collision indicates a caution situation of impending collision.

14. A pedestrian and driver alert and/or collision avoidance system according to claim 8, wherein the at least one sensing device comprises a plurality of sensing devices mounted on plurality of first locations around the vehicle to detect the presence of a pedestrian in all areas around the vehicle, and wherein the at least one pedestrian warning system comprises a plurality of pedestrian warning systems around the vehicle to generate a pedestrian visual warning or a pedestrian audible alarm to alert the pedestrian responsive to the one of the plurality of pedestrian warning systems.

15. A pedestrian and driver alert and/or collision avoidance system according to claim 14, wherein the pedestrian is provided the visual warning or the audible alarm from at least one of the plurality of pedestrian warning systems responsive to predetermined criteria including distance between the pedestrian and the pedestrian warning system.

16. A pedestrian and driver alert and/or collision avoidance system according to claim 8, wherein the pedestrian and driver alert and/or collision avoidance system is configured to sense the exterior hazard in at least one of the first, second or third states of potential collision responsive to the first predetermined criteria including at least one input trigger generated by at least one digital or at least one analog vehicle system.

17. A pedestrian and driver alert and/or collision avoidance system according to claim 8, wherein the pedestrian and driver alert and/or collision avoidance system is configured to sense the exterior hazard in at least one of the first, second or third states of potential collision responsive to the first predetermined criteria including at least one input trigger generated by at least one digital or at least one analog vehicle system, the at least one trigger activating a discrete and configurable external alert and comprising a signal generated by at least one of: a door switch, a reverse light, a marker light, a video camera, a light source, a mirror system or operation of a vehicle.

18. A pedestrian and driver alert and/or collision avoidance system according to claim 8, wherein the pedestrian and driver alert and/or collision avoidance system is configured to sense the exterior hazard in at least one of the first, second or third states of potential collision responsive to the first predetermined criteria including at least one input trigger generated by at least one digital system or at least one analog system, the at least one trigger determined by monitoring a controller area network (CAN) transmission.

19. A pedestrian and driver alert and/or collision avoidance system according to claim 8, wherein the pedestrian and driver alert and/or collision avoidance system is configured to monitor a controller area network (CAN) transmission for a CAN/J1939 message, and at least one of the pedestrian warning system or driver warning system is configured to generate a warning responsive to the CAN/J1939 message.

20. A pedestrian and driver alert and/or collision avoidance system according to claim 8, wherein the pedestrian and driver alert and/or collision avoidance system is configured to sense the exterior hazard in at least one of the first, second or third states of potential collision responsive to the first predetermined criteria including at least one input trigger, and wherein the pedestrian and driver alert and/or collision avoidance system further comprises at least one audio codec circuit and digital signal processor (DSP) evaluation to read from a memory to convert an audio file into a line-level signal to be amplified responsive to the at least one trigger.

21. A pedestrian and driver alert and/or collision avoidance system according to claim 8, wherein the at least one sensing device comprising an object detecting sensor system.

22. A pedestrian and driver alert and/or collision avoidance system according to claim 21, wherein the object detecting sensor system comprising one or more optical sensors configured to emit one of infrared, red or laser light to a target, and wherein the target breaks or reflects the emitted light back to the one or more optical sensors to activate a sensor output.

23. A pedestrian and driver alert and/or collision avoidance system according to claim 21, wherein the object detecting sensor system comprising a radar system configured to emit radio waves to a target, and wherein the target reflects the emitted radio waves back to the radar system to determine the range, altitude, direction, or speed of the target.

24. A pedestrian and driver alert and/or collision avoidance method for a large vehicle, comprising the steps of:
sensing an exterior hazard in first, second and third states of potential collision in a first field of view responsive to first predetermined criteria when a vehicle is travelling in a first direction;
generating a first driver visual warning to alert the driver when the exterior hazard is detected in the first state of potential collision,
generating a second driver visual warning configured to alert the driver when the exterior hazard is detected in the second state of potential collision;
generating a first pedestrian visual warning and a first pedestrian audio warning to alert the pedestrian when the exterior hazard is detected in the first state of potential collision,
generating a second pedestrian visual warning configured to alert the pedestrian when the exterior hazard is detected in the second state of potential collision; and
detecting a level of an environmental noise data on at least one side of the vehicle, wherein the environmental noise data are used in the generating of the first pedestrian audio warning.

25. A pedestrian and driver alert and/or collision avoidance method according to claim 24, wherein the first pedestrian visual warning is issued via at least one of: a first strobe or light source when at least one of: the vehicle's speed is within the first predetermined speed range, the vehicle's yaw rate is within the first predetermined yaw rate range or the pedestrian is within a first predetermined distance to the vehicle.

26. A pedestrian and driver alert and/or collision avoidance method according to claim 24, further comprising:
detecting, by at least one ambient sensor, level of an environmental noise data on at least one side of the vehicle; and
transmitting the environmental noise data to the pedestrian alarm system, wherein a volume of the first speaker is dynamically adjusted responsive to the environmental noise data.

27. A pedestrian and driver alert and/or collision avoidance method according to claim 24, further comprising:

waiting for a pre-configured time period before generating the first pedestrian audio warning.

28. A pedestrian and driver alert and/or collision avoidance method according to claim 24, further comprising:
emitting continuous sound or bursts of sound at one or more of: a configurable frequency, volume or pattern when in motion and within a distance threshold with a pedestrian.

* * * * *